United States Patent
Takahashi et al.

(10) Patent No.: US 11,061,351 B2
(45) Date of Patent: Jul. 13, 2021

(54) MEASURING DEVICE AND IMAGE FORMING APPARATUS

(71) Applicant: CANON KABUSHIKI KAISHA, Tokyo (JP)

(72) Inventors: Hiroyuki Takahashi, Abiko (JP); Naoto Tokuma, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/736,350

(22) Filed: Jan. 7, 2020

(65) Prior Publication Data

US 2020/0218187 A1 Jul. 9, 2020

(30) Foreign Application Priority Data

Jan. 9, 2019 (JP) .............................. JP2019-002227

(51) Int. Cl.
| | |
|---|---|
| *G03G 15/00* | (2006.01) |
| *G01J 3/42* | (2006.01) |
| *G01J 3/50* | (2006.01) |
| *H04N 1/00* | (2006.01) |
| *G03G 21/16* | (2006.01) |

(52) U.S. Cl.
CPC ............ *G03G 15/5062* (2013.01); *G01J 3/42* (2013.01); *G01J 3/50* (2013.01); *G03G 15/5025* (2013.01); *G03G 21/1647* (2013.01); *H04N 1/00018* (2013.01); *H04N 1/00023* (2013.01); *G01J 2003/425* (2013.01); *G03G 2215/0158* (2013.01)

(58) Field of Classification Search
CPC ........... G03G 15/5016; G03G 15/5025; G03G 15/5062; G03G 2215/00616; G03G 2215/0158; G01J 3/42; G01J 3/50; G01J 2003/425; H04N 1/00018; H04N 1/00023
See application file for complete search history.

(56) References Cited

U.S. PATENT DOCUMENTS

| | | | | |
|---|---|---|---|---|
| 4,378,153 A | * | 3/1983 | Nishimura | G03G 15/04 355/1 |
| 4,641,953 A | * | 2/1987 | Oushiden | G03G 15/5016 250/201.7 |
| 4,699,501 A | * | 10/1987 | Watanabe | G03G 15/5016 399/11 |

(Continued)

FOREIGN PATENT DOCUMENTS

JP        2009-53346         3/2009

*Primary Examiner* — David J Bolduc
(74) *Attorney, Agent, or Firm* — Venable LLP

(57) ABSTRACT

A measuring device a measurement unit configured to measure an image on a sheet, the measurement unit including a light emitting portion configured to illuminate the sheet with light, and a detecting portion configured to detect light reflected by the sheet; a supporting unit supporting the measurement unit; and a driving unit configured to move the measurement unit supported by the supporting unit in a scanning direction. A size, in the scanning direction, of a detectable range of the detecting portion in which the detecting portion is capable of detecting the reflected light from the sheet is larger than a size, in a sub-scanning direction perpendicular to the scanning direction and a normal direction of a surface of the sheet, of the detectable range of the detecting portion.

9 Claims, 12 Drawing Sheets

(56) References Cited

U.S. PATENT DOCUMENTS

| | | | | |
|---|---|---|---|---|
| 4,731,667 A * | 3/1988 | Watanabe | G03G 15/5016 | 355/75 |
| 4,734,868 A * | 3/1988 | DeLacy | B41J 11/46 | 358/1.12 |
| 4,755,855 A * | 7/1988 | Watanabe | G03G 15/04 | 399/394 |
| 4,965,597 A * | 10/1990 | Ohigashi | H04N 1/047 | 347/118 |
| 5,172,167 A * | 12/1992 | Ito | G03G 15/36 | 399/187 |
| 5,266,976 A * | 11/1993 | Ohigashi | H04N 1/508 | 347/116 |
| 5,296,939 A * | 3/1994 | Suzuki | G03G 15/01 | 358/453 |
| 5,392,099 A * | 2/1995 | Kusumoto | G03G 15/0258 | 250/325 |
| 5,539,434 A * | 7/1996 | Fuse | B41J 2/04505 | 347/19 |
| 5,627,571 A * | 5/1997 | Anderson | B41J 2/125 | 347/19 |
| 5,777,638 A * | 7/1998 | Salter | B41J 25/001 | 347/12 |
| 6,158,344 A * | 12/2000 | Walker | H04N 1/00002 | 101/483 |
| 6,241,334 B1 * | 6/2001 | Haselby | B41J 2/2135 | 347/19 |
| 6,243,124 B1 * | 6/2001 | Ozaki | H04N 1/00082 | 347/236 |
| 6,352,331 B1 * | 3/2002 | Armijo | B41J 2/0458 | 347/19 |
| 6,364,549 B1 * | 4/2002 | Lesniak | B41J 11/0095 | 400/582 |
| 6,425,650 B1 * | 7/2002 | Walker | B41J 29/393 | 347/14 |
| 6,547,355 B1 * | 4/2003 | Shimada | B41J 2/2132 | 347/12 |
| 6,556,315 B1 * | 4/2003 | Kommrusch | H04N 1/0009 | 358/473 |
| 6,765,674 B2 * | 7/2004 | Orelli | G01J 3/02 | 356/402 |
| 6,930,786 B2 * | 8/2005 | Kataoka | G03G 15/0194 | 358/1.12 |
| 6,964,465 B2 * | 11/2005 | Endo | B41J 2/04505 | 347/19 |
| 7,219,977 B2 * | 5/2007 | Mitsuzawa | B41J 2/2135 | 347/12 |
| 7,364,251 B2 * | 4/2008 | Arakawa | B41J 11/46 | 271/265.01 |
| 7,494,204 B2 * | 2/2009 | Otsuki | B41J 11/42 | 347/16 |
| 7,556,333 B2 * | 7/2009 | Mitsuzawa | B41J 2/2135 | 347/104 |
| 7,591,526 B2 * | 9/2009 | Mitsuzawa | B41J 2/15 | 347/19 |
| 7,665,818 B2 * | 2/2010 | Yoshida | B41J 11/425 | 347/16 |
| 7,806,497 B2 * | 10/2010 | Mitsuzawa | B41J 2/2132 | 347/12 |
| 8,336,980 B2 * | 12/2012 | Sanada | B41J 29/393 | 347/14 |
| 8,523,310 B2 * | 9/2013 | Uchida | B41J 2/1752 | 347/16 |
| 8,964,242 B2 * | 2/2015 | Kuno | G06K 15/105 | 358/1.8 |
| 9,016,820 B2 * | 4/2015 | Uchida | B41J 2/2139 | 347/14 |
| 9,223,279 B2 * | 12/2015 | Goto | G03G 15/5062 | |
| 2003/0048326 A1 * | 3/2003 | Yamasaki | H04N 1/00063 | 347/41 |
| 2003/0210412 A1 * | 11/2003 | Ishibashi | B41J 2/2135 | 358/1.9 |
| 2004/0042807 A1 | 3/2004 | Nakayama | | |
| 2004/0075708 A1 * | 4/2004 | Arakawa | B41J 29/393 | 347/19 |
| 2005/0206978 A1 * | 9/2005 | Sone | H04N 1/0005 | 358/516 |
| 2006/0268374 A1 * | 11/2006 | Kim | H04N 1/053 | 358/497 |
| 2007/0024924 A1 * | 2/2007 | Ikeno | H04N 1/00493 | 358/474 |
| 2007/0153077 A1 * | 7/2007 | Yamauchi | G03G 15/5062 | 347/116 |
| 2007/0242319 A1 * | 10/2007 | Okada | H04N 1/00002 | 358/486 |
| 2008/0174763 A1 * | 7/2008 | Ehbets | G01J 3/027 | 356/51 |
| 2008/0240829 A1 * | 10/2008 | Miyazaki | H04N 1/00015 | 400/76 |
| 2008/0292370 A1 * | 11/2008 | Murayama | G03G 15/0131 | 399/301 |
| 2009/0148181 A1 * | 6/2009 | Niihara | G03G 15/6591 | 399/126 |
| 2009/0162112 A1 * | 6/2009 | Murayama | H04N 1/32309 | 399/301 |
| 2009/0231645 A1 * | 9/2009 | Hayashi | H04N 1/00068 | 358/520 |
| 2010/0079774 A1 * | 4/2010 | Yamazaki | B41J 2/155 | 358/1.5 |
| 2010/0243697 A1 * | 9/2010 | Aoki | B41J 11/46 | 226/9 |
| 2010/0310264 A1 * | 12/2010 | Ishida | G03G 15/5029 | 399/45 |
| 2012/0163844 A1 * | 6/2012 | Murayama | G03G 15/5058 | 399/49 |
| 2012/0287485 A1 * | 11/2012 | Chen | H04N 1/00018 | 358/497 |
| 2013/0066172 A1 * | 3/2013 | Kulcke | A61B 5/7239 | 600/310 |
| 2013/0135650 A1 * | 5/2013 | Kuronuma | H04N 1/00015 | 358/1.13 |
| 2013/0243451 A1 | 9/2013 | Hirota | | |
| 2013/0250322 A1 * | 9/2013 | Kawabata | H04N 1/6055 | 358/1.9 |
| 2013/0250378 A1 * | 9/2013 | Kitai | H04N 1/00002 | 358/504 |
| 2014/0037351 A1 * | 2/2014 | Matsui | G03G 15/50 | 399/389 |
| 2014/0186076 A1 * | 7/2014 | Murayama | G03G 15/5058 | 399/301 |
| 2014/0307290 A1 * | 10/2014 | Isokawa | H04N 1/0005 | 358/1.15 |
| 2015/0261163 A1 * | 9/2015 | Ishii | G03G 15/5062 | 250/559.16 |
| 2015/0286179 A1 * | 10/2015 | Sugiyama | G03G 15/5058 | 399/49 |
| 2016/0114603 A1 * | 4/2016 | Momen | H04N 1/00702 | 250/206.1 |
| 2016/0269598 A1 * | 9/2016 | Hayashi | H04N 1/00005 | |
| 2017/0052068 A1 * | 2/2017 | Nagai | G01J 3/50 | |
| 2017/0075276 A1 * | 3/2017 | Fujikura | G03G 15/5029 | |
| 2017/0078505 A1 * | 3/2017 | Goto | H04N 1/00702 | |
| 2017/0082493 A1 * | 3/2017 | Nagai | G01J 3/52 | |
| 2017/0131670 A1 * | 5/2017 | Ino | G03G 15/5054 | |
| 2017/0134604 A1 * | 5/2017 | Mukaibara | H04N 1/0664 | |
| 2017/0248889 A1 * | 8/2017 | Uematsu | G03G 15/5062 | |
| 2017/0314993 A1 * | 11/2017 | Harada | G01J 3/52 | |
| 2017/0314994 A1 * | 11/2017 | Tanimura | G01J 3/463 | |
| 2017/0374217 A1 * | 12/2017 | Ishida | H04N 1/00018 | |
| 2018/0013907 A1 * | 1/2018 | Nakaie | H04N 1/193 | |
| 2018/0039215 A1 * | 2/2018 | Ishida | G03G 15/5062 | |
| 2018/0045572 A1 * | 2/2018 | Harada | H04N 1/00816 | |
| 2018/0052052 A1 * | 2/2018 | Tanimura | G01J 3/52 | |
| 2018/0084145 A1 * | 3/2018 | Isokawa | G03G 15/043 | |
| 2018/0159989 A1 * | 6/2018 | Mizuno | H04N 1/00005 | |
| 2018/0176401 A1 * | 6/2018 | Shimizu | H04N 1/00034 | |

* cited by examiner

Fig. 4

Header size: 270176 bytes
CMMYType: 'appl'
version: 0x02002001
profileClose: 'Drtr'
dataColorSpace: 'CMYK'
interchangeSpace: 'XYZ'
CreationDate: 3.4.1996, 19:16:14
CS23ignature: 'acsp' prim.platform: 'APPL'
flags: 0x00000000
deviceManufacturer: 'EF1'
deviceModel: 0
deviceAttributes: 0x00000000, 0x00000000
renderingIntent: 2
white XYZ: X = 0.9642, Y = 1.0000, Z = 0.8249

Tag Table  <10 elements, double-click to inspect>

| Ind | Signet. | elementoffset | Size |
|---|---|---|---|
| 0 | 'A2B0' | 252 = 0x000000FC | 43002 |
| 1 | 'B2A0' | 43256 = 0x0000A8F8 | 42940 |
| 2 | 'A2B1' | 86196 = 0x00015084 | 43002 |
| 3 | 'B2A1' | 129200 = 0x0001F880 | 42940 |
| 4 | 'A2B2' | 172140 = 0x0002A06C | 43002 |
| 5 | 'B2A2' | 215144 = 0x00034868 | 42940 |
| 6 | 'gamt' | 258084 = 0x0003F024 | 11925 |
| 7 | 'desc' | 270012 = 0x00041EBC | 125 |
| 8 | 'cprt' | 270140 = 0x00041F3C | 14 |
| 9 | 'wtpt' | 270156 = 0x00041F3C | 20 |

(a)
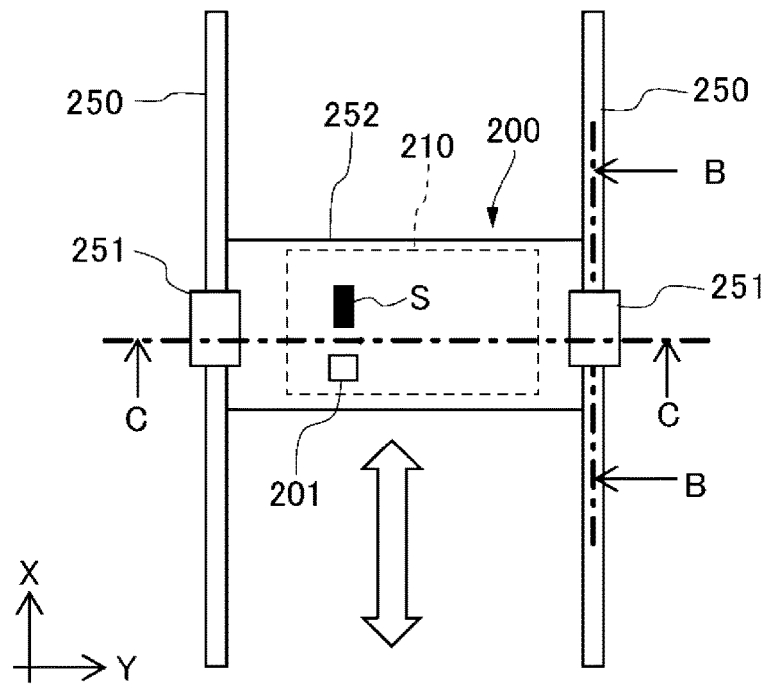
(b)
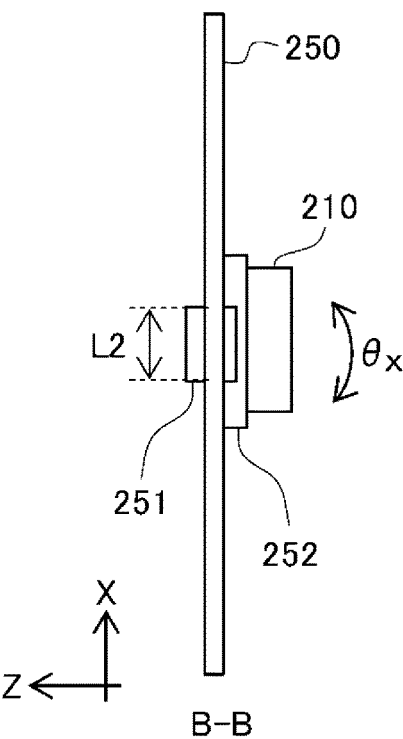
B-B
(c)
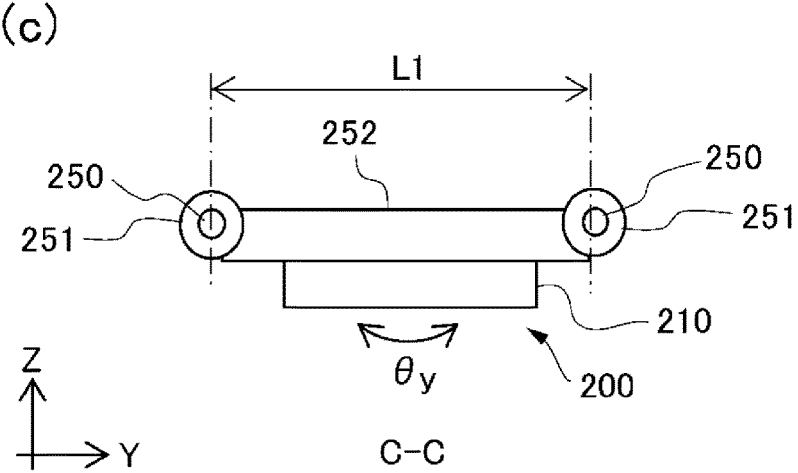
C-C
Fig. 9

MEASURING DEVICE AND IMAGE FORMING APPARATUS

FIELD OF THE INVENTION AND RELATED ART

The present invention relates to a measuring device for measuring a sheet of recording medium. It relates to an image forming apparatus having such a measuring device.

With the expansion of the on-demand printer market, demand has been increasing for an image forming apparatus having a color management function for achieving a high level of color reproduction. There have been known image forming apparatuses and image formation systems, which are provided with a sensor for measuring in color a patterned image formed on a sheet of recording medium. In the case of these apparatuses and systems, their image formation settings are changed based on the results of the measurement by a sensor. There is disclosed in U.S. Publications Nos. 2004-0042807 and 2013-0243451, a technology which places a sensor for measuring a patch (image) on a sheet of recording medium in spectral reflectance, and changes the electrophotographic unit in settings (for example, tone correction table, various bias voltages values), based on the results of the measurement by the sensor.

Further, there is disclosed in Japanese Laid-open Patent Application No. 2009-53346, an image forming apparatus provided with a color sensor. In the case of this image forming apparatus, the color sensor is supported by a supporting member, which is in the form of a rail, so that a pattern (image) on a sheet of recording paper is scanned by the color sensor while the sensor is moved relative to the sheet of recording paper.

A sensor for measuring an image in spectral reflectance by detecting the light reflected by the image is affected in measurement accuracy by the change in its position relative to the sheet. Generally speaking, the smaller the amount by which light is shed on a sheet of recording medium, and the less in depth of field an optical system for guiding the light reflected by the image to an imaging element, the stricter the condition which the sensor requires regarding its position relative to the object of measurement. However, in a case where an image forming apparatus is structured so that its color sensor moves relative to the sheet, like the one disclosed in Japanese Laid-open Patent Application No. 2009-53346, if the sensor tilts while it being moved, the sensor may change in the relationship between itself, and the point of measurement on the sheet, making it possible that the sensor will reduce in measurement accuracy.

SUMMARY OF THE INVENTION

The present invention provides a measuring device which is substantially higher in measurement accuracy than any conventional one, an image formation system having such a measuring device, and an image forming apparatus having such a measuring device.

According to an aspect of the present invention, there is provided a measuring device comprising: a measurement unit configured to measure an image on a sheet, said measurement unit including a light emitting portion configured to illuminate the sheet with light, and a detecting portion configured to detect light reflected by the sheet a supporting unit supporting said measurement unit and a driving unit configured to move said measurement unit supported by said supporting unit in a scanning direction; wherein a size, in the scanning direction, of a detectable range of said detecting portion in which said detecting portion is capable of detecting the reflected light from the sheet is larger than a size, in a sub-scanning direction perpendicular to the scanning direction and a normal direction of a surface of the sheet, of the detectable range of said detecting portion.

According to another aspect of the present invention, there is provided an image forming apparatus comprising: an image forming device including an image forming unit configured to form an image on a sheet a measuring device connected with said image forming apparatus and configured to measure the image formed on the sheet by said image forming device; wherein said image forming device changes a condition of an image forming operation of said image forming unit on the basis of a measurement result of said measuring device, wherein said measuring device includes, a measurement unit configured to measure an image on a sheet, said measurement unit including a light emitting portion configured to illuminate the sheet with light, and a detecting portion configured to detect light reflected by the sheet a supporting unit supporting said measurement unit and a driving unit configured to move said measurement unit supported by said supporting unit in a scanning direction; wherein a size, in the scanning direction, of a detectable range of said detecting portion in which said detecting portion is capable of detecting the reflected light from the sheet is larger than a size, in a sub-scanning direction perpendicular to the scanning direction and a normal direction of a surface of the sheet, of the detectable range of said detecting portion.

According to the present invention, it is possible to provide a measuring device which is substantially higher in measurement accuracy than any conventional one, an image formation system having such a measuring device, and an image forming apparatus having such a measuring device.

Further features of the present invention will become apparent from the following description of exemplary embodiments with reference to the attached drawings.

BRIEF DESCRIPTION OF THE DRAWINGS

FIG. 4 is a drawing for describing the structure of the ICC profile.

Figure 7:
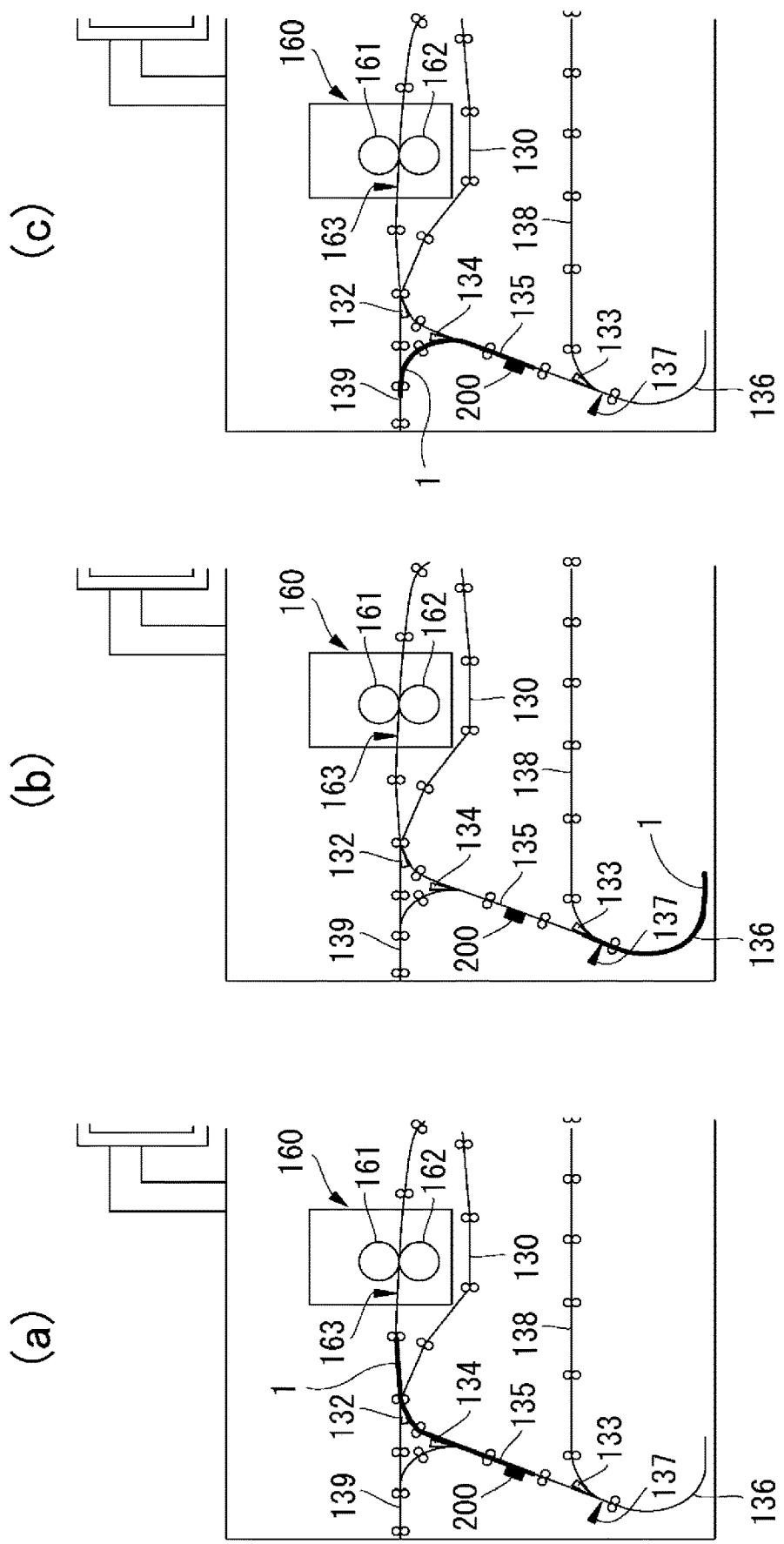

Parts (a), (b) and (c) of FIG. 7 illustrate the sheet position when the image forming apparatus in the first embodiment is in the color correction mode.

Figure 8:
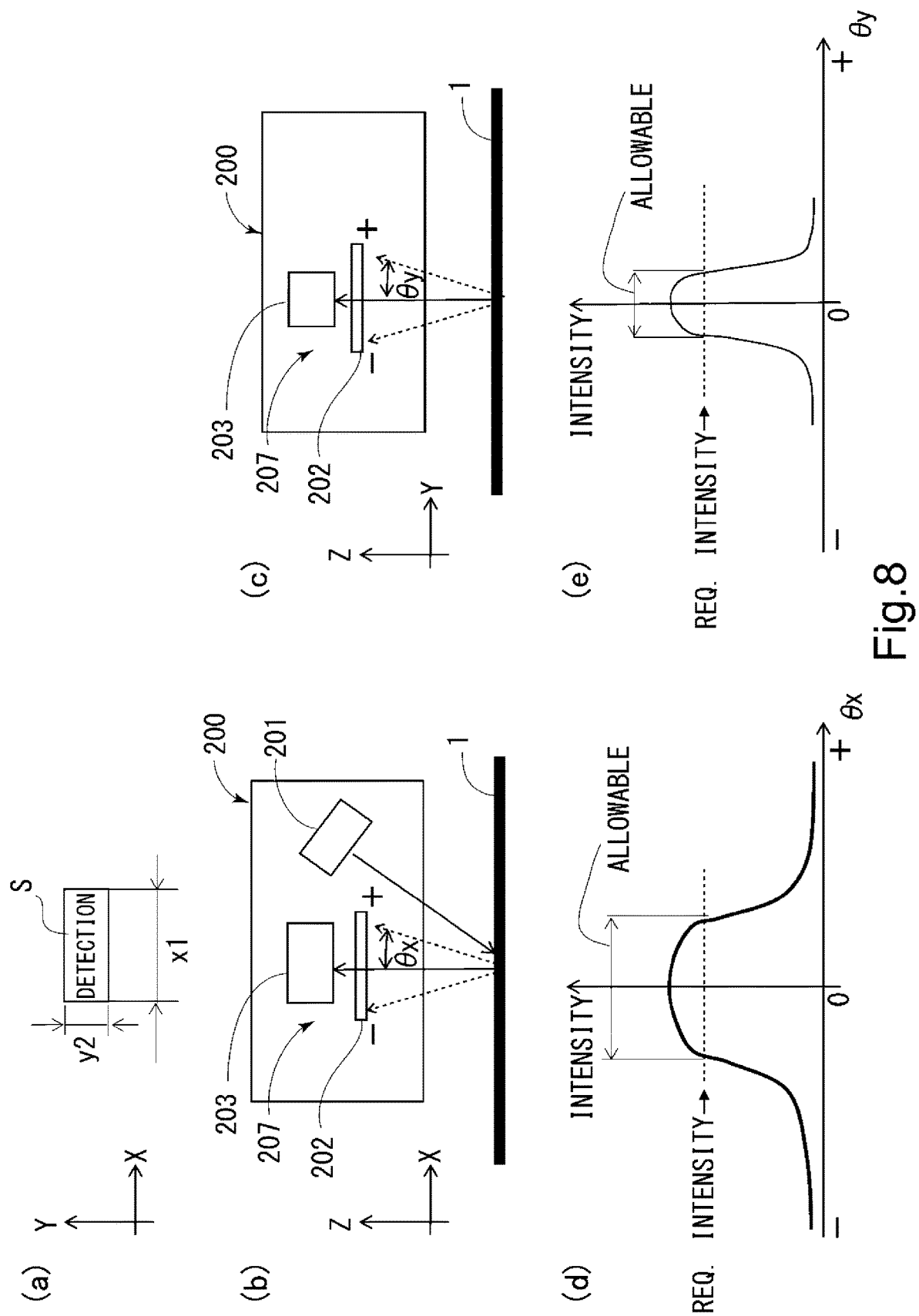

Parts (a), (b), (c), (d) and (e) of FIG. 8 illustrate the relationship between the tilt of the color sensor, and the amount by which the light reflected by a sheet of recording medium is detected by the sensor.

Parts (a), (b) and (c) of FIG. 9 illustrate the means for moving the color sensor in this embodiment, about its structure.

Figure 10:
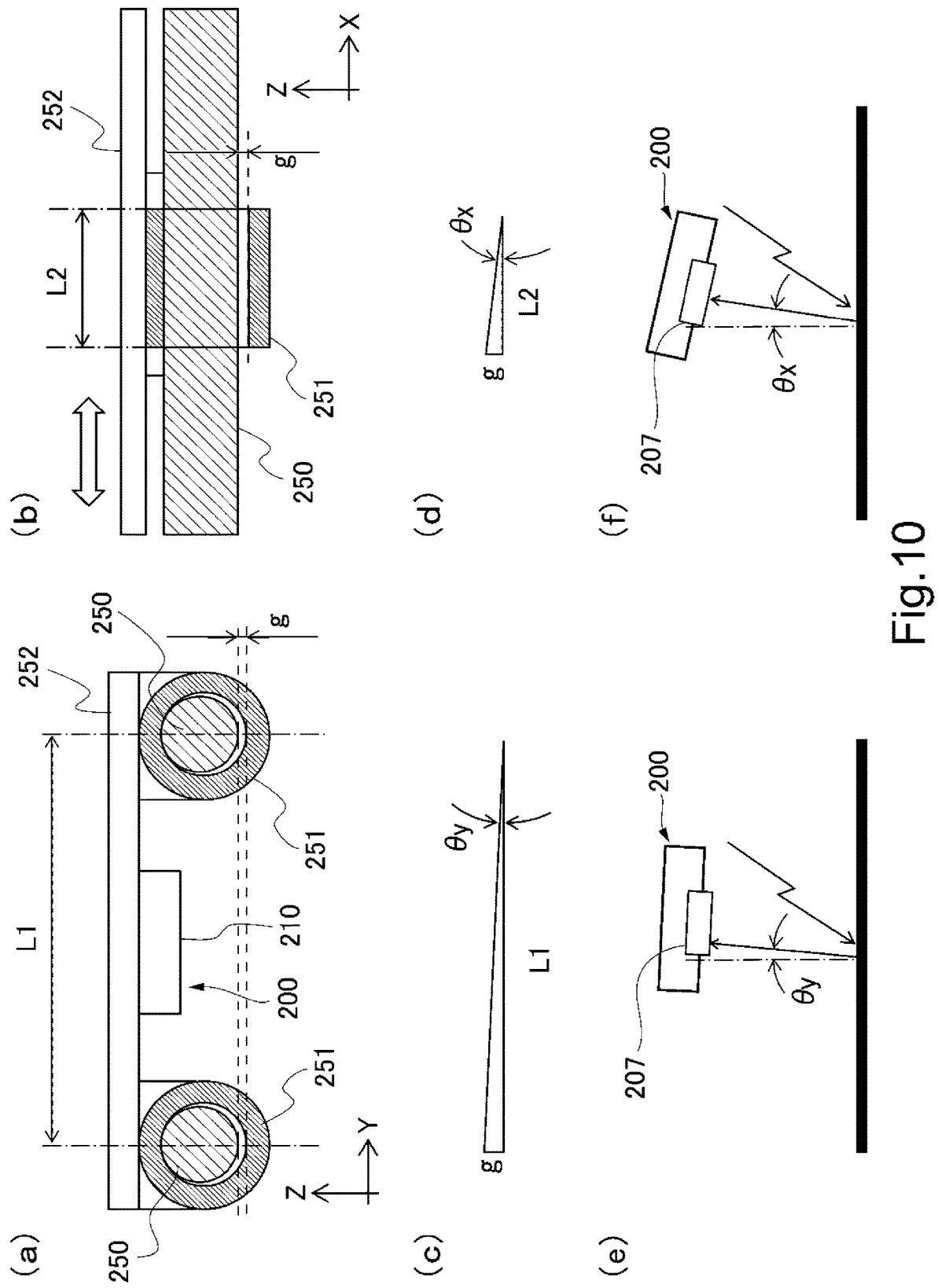

Parts (a) and (b) of FIG. 10 are sectional views of the color sensor in this embodiment, and parts (c), (d), (e) and (f) thereof illustrate tilting of the sensor in the primary and secondary scanning directions.

Figure 11:
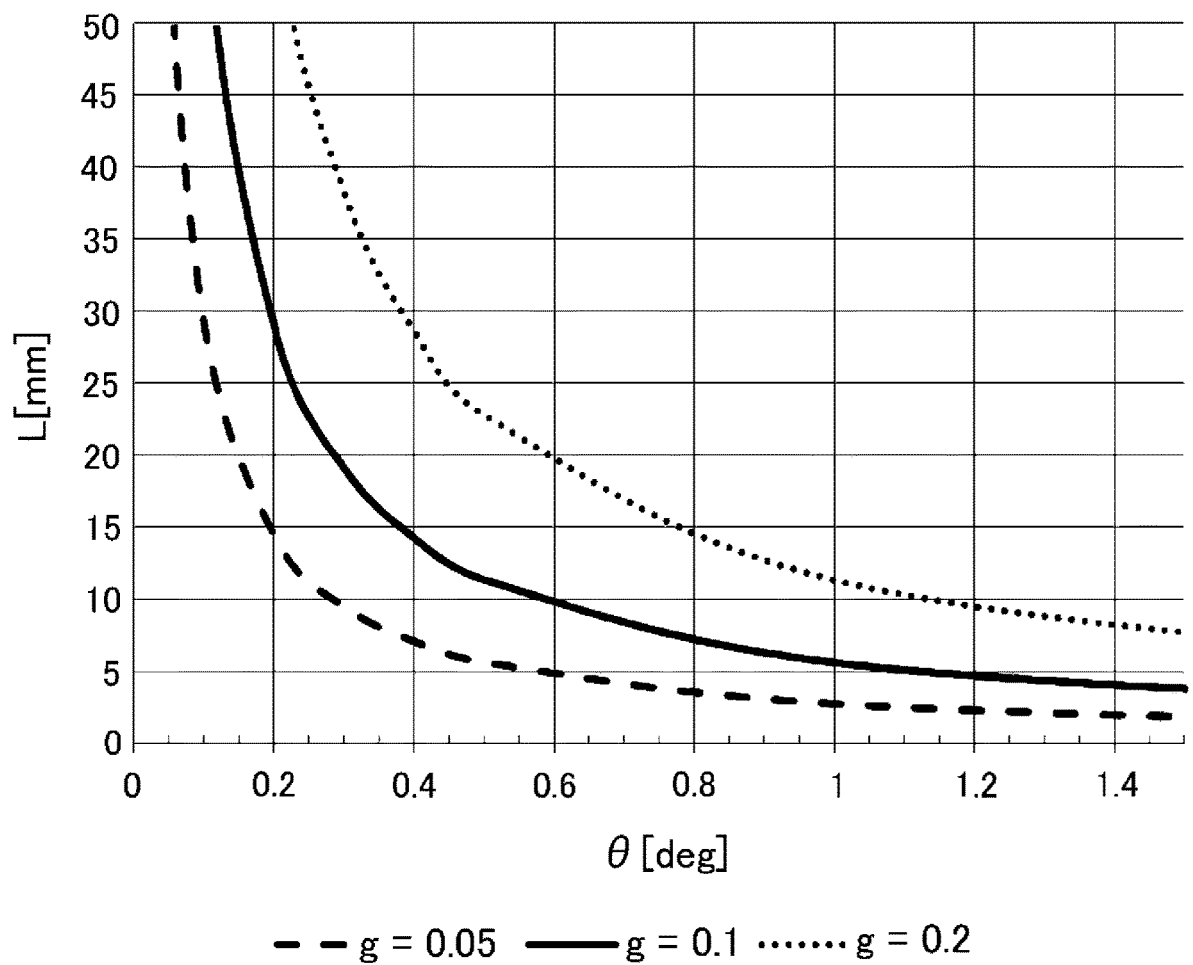

FIG. 11 is a graph which shows the relationship between the amount of clearance between the sensor supporting shaft, and the shaft-engaging portion of the color sensor, and the tolerance for the tilting of the sensor.

Figure 12:
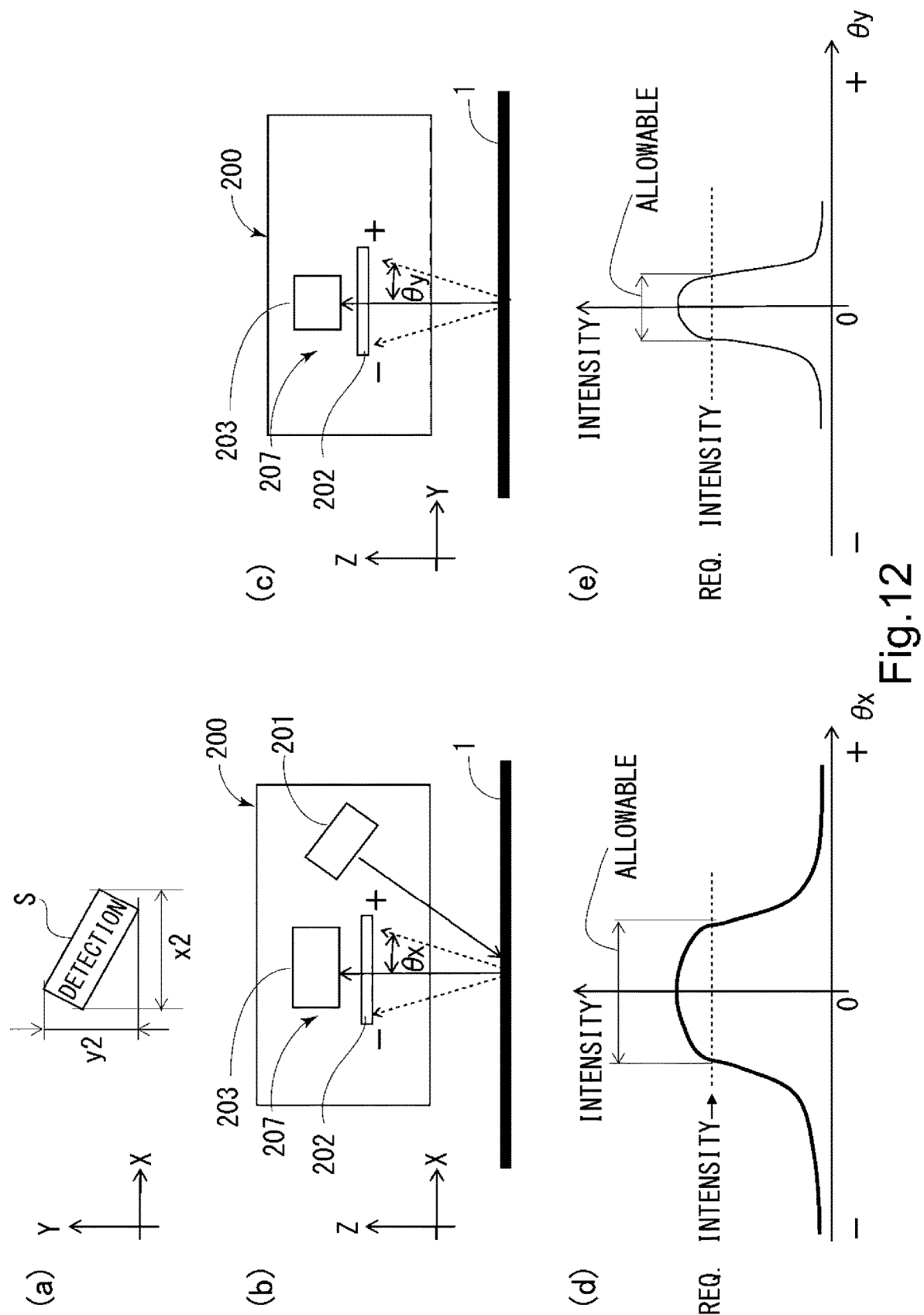

Parts (a), (b), (c), (d) and (e) of FIG. 12 illustrate the relation between the amount of tilting of the color sensor, and the amount by which the light reflected by the sheet is sensed by the sensor.

DESCRIPTION OF THE EMBODIMENTS

Hereinafter, the present invention is concretely described with reference to a few of preferred embodiments of the present invention, and appended drawings.

Embodiment 1

Figure 1:
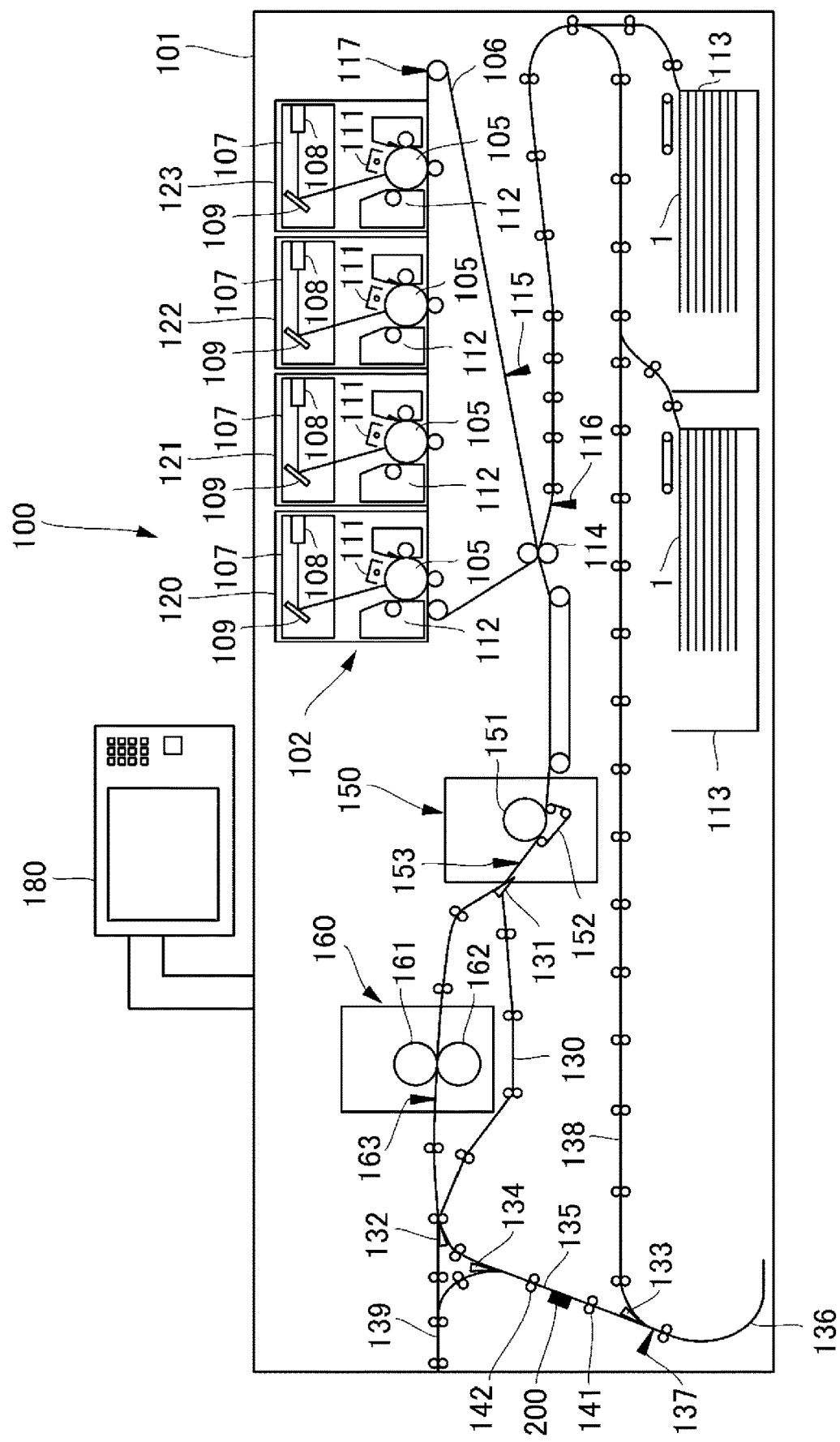
FIG. 1 is a schematic sectional view of the image forming apparatus in the first embodiment of the present invention.

FIG. 1 is a schematic drawing of the image forming apparatus 100 in the first embodiment of the present invention. The image forming apparatus 100 is provided with a casing 101, in which an image formation engine 102 and a control board storing portion are disposed. The control board storing portion stores a printer controller 103, which controls the operation of the image forming apparatus 100. The printer controller 103 will be described later. The image formation engine 102, which is an image forming means in this embodiment, comprises: an optical processing system which forms an image on a sheet 1 of recording medium with the use of an electrophotographic process; an image fixing system; a sheet feeding system, which feeds a sheet 1 of recording medium into the main assembly of the image forming apparatus 100; and a sheet conveyance system for conveying the sheet 1, in the main assembly. As recording media, a sheet 1 of ordinary paper, cardstock, processed paper such as coated paper, embossed paper, plastic film, fabric, and the like, are usable.

The optical processing system has: stations 120, 121, 122 and 123, which form yellow, magenta, cyan and black toner images, respectively; and an intermediary transfer belt 106. In each of the stations 120, 121, 122 and 123, a photosensitive drum 105, which is a photosensitive member which is in the form of a drum, is charged across its peripheral surface by a primary charging device 111. The laser scanner portion 107 exposes the photosensitive drum 105, in accordance with command signals, which are generated based on the image data and transmitted to the laser scanner portion 107. The laser scanner portion 107 has a laser driver which turns on or off the beam of laser light emitted from an unshown semiconductor laser. It guides the beam of light from the semiconductor laser to a rotational polygonal mirror by way of a reflection mirror 109, while causing the beam of laser light to oscillate in the primary scan direction. Consequently, an electrostatic latent image, which corresponds to the image data, is effected on the peripheral surface of the photosensitive drum 105.

A developing device 112 internally holds developer which includes toner. It supplies the photosensitive drum 105 with charged toner particles. As the charged toner particles adhere to the peripheral surface of the photosensitive drum 105 in the pattern of the distribution of the surface potential across the peripheral surface of the photosensitive drum 105, the electrostatic latent image on the photosensitive drum 105 is developed into a visible image formed of toner, which hereafter will be referred to as a "toner image". Then, the toner image on the photosensitive drum 105 is transferred (primary transfer) onto the intermediary transfer belt 106, to which such voltage that is opposite in polarity from the normal toner charge, is being applied. In a case where a color image is formed, the four toner images formed by the four stations 120-123, one for one, are transferred onto the intermediary transfer belt 106 in such a manner that the four toner images are layered on the intermediary transfer belt 106, in order to form a full-color toner image on the intermediary transfer belt 106. Meanwhile, the sheet feeding system feeds sheets 1 of recording medium, one by one, into the main assembly of the image forming apparatus 100. More specifically, multiple sheets 1 of recording medium are stored in the sheet storage 113, which is removably installable in the casing 101 of the image forming apparatus 100. Then, each sheet 1 of recording medium is fed into the casing 101, and conveyed to a transfer roller 114. After being transferred onto the intermediary transfer belt 106, which is an intermediary transferring member, the toner image on the intermediary transfer belt 106 is transferred (secondary transfer) onto the sheet 1 of recording medium.

The image forming apparatus 100 is provided with: a sensor 115 for detecting the point on a sheet of recording medium, at which printing is to be started during an image forming operation; a sensor 116 for detecting the timing with which each sheet 1 of recording medium is to be fed into the casing 101, and a sensor 117 for detecting the density of the image. These sensors are positioned in the adjacencies of the intermediary transfer belt 106. The density sensor 117 measures the density of the patches (test images) on the intermediary transfer belt 106. The printer controller 103 adjusts the image forming apparatus 100 in the operational settings (for example, target potential level of the primary charging device 111, and bias voltage for developing device 112) of the optical processing system, based on the results of the detection by the density sensor 117.

The fixing system in this embodiment comprises the first fixing device 150 and second fixing device 160. The first fixing device 150 includes: a fixation roller 151 for applying heat to the sheet 1 of recording medium; a pressure belt 152 for pressing the sheet 1 upon the fixation roller 151; a first post-fixation sensor 153 for detecting the completion of the fixing process by the first and second fixing device 150. Each of the rollers which include the fixation roller 151 is hollow, and contains a heater. The first fixing device 150 applies heat and pressure to the toner image on the sheet 1 while conveying the sheet 1 by a pair of rotationally movable members, that is, the fixation roller 151 and pressure belt 152. Consequently, the toner particles melt. Then, they become permanently fixed to the sheet 1 as they cool down; the toner image becomes fixed to the sheet 1.

The second fixing device 160 is disposed on the downstream side of the first fixing device 150, in the sheet conveyance passage. It increases in glossiness, the toner image on the sheet 1 of recording medium after the fixation of the toner image by the first fixing device 150, and also, ensures that the fixed toner image remains fixed to the sheet 1. The second fixing device 160 also has: a pair of rotational members, more specifically, the fixation roller 161 and pressure roller 162, which heat and press the sheet 1 while conveying the sheet 1; and a second post-fixation sensor 163 for detecting the completion of the fixing process by the second fixing device 160.

By the way, it occurs in some cases that certain types of sheets of recording medium do not require to be conveyed through the second fixing device 160. The image forming apparatus 100 has a bypass 130 through which the sheet 1 is discharged without being conveyed through the second fixing device 160 to reduce the image forming apparatus 100 in the amount of energy consumption. In such cases, as the sheet 1 is conveyed out of the first fixing device 150, it is guided into the second fixing device 160 or bypass 130 by a first sheet directing flapper 131.

After being conveyed through the second fixing device 160 or by pass 130, the sheet 1 is guided to a discharge pass 139 or reversal pass 135 by a second sheet directing flap 132. As the sheet 1 is conveyed into the reversal pass 135, its position is detected by the reversal pass sensor 137. Then, it is reversed in orientation in terms of the recording medium conveyance direction by the switch-back operation of a sheet reversing portion 135.

The sheet reversal pass 135 is provided with a color sensor 200 for measuring the test patches on the sheet 1 in chromatic properties. The structure of the color sensor 200, and the method for adjusting in settings, the image formation engine 102 which employs the color sensor 200, are described later.

When the image forming apparatus 100 is in the two-sided printing mode, the sheet 1 of recording medium, across the first surface of which an image has just been formed, is reversed in orientation in terms of the recording medium conveyance direction by the reversing portion 136. Then, the sheet 1 is conveyed toward the transfer roller 114 for the second time, through the reconveyance pass 138 so that an image is formed on its second surface. After the formation of an image on the first surface of the sheet 1 in the one side printing mode, or the formation of an image on the second surface of the sheet 1 in the two side printing mode, the sheet 1 is discharged out of the image forming apparatus 100 through the discharge pass 139. Further, the image forming apparatus 100 is provided with a sheet directing flapper 134 which is enabled to guide the sheet 1 toward the discharge pass 139 after the sheet 1 is switched back by the reversing portion 136. The sheet directing flapper 134 is positioned between the reversal 135 and discharge pass 139. By the way, the image forming apparatus 100 is also provided with a sheet directing flapper 134 which is enabled to guide the sheet 1 toward the discharge pass 139 after the sheet 1 is switched back by the reversing portion 136. The sheet directing flapper 134 is positioned between the reversal pass 135 and discharge pass 139 to make it possible for a user to choose which of two surfaces of the sheet 1 will be on the top side as the sheet 1 is discharged out of the image forming apparatus 100.

Figure 2:
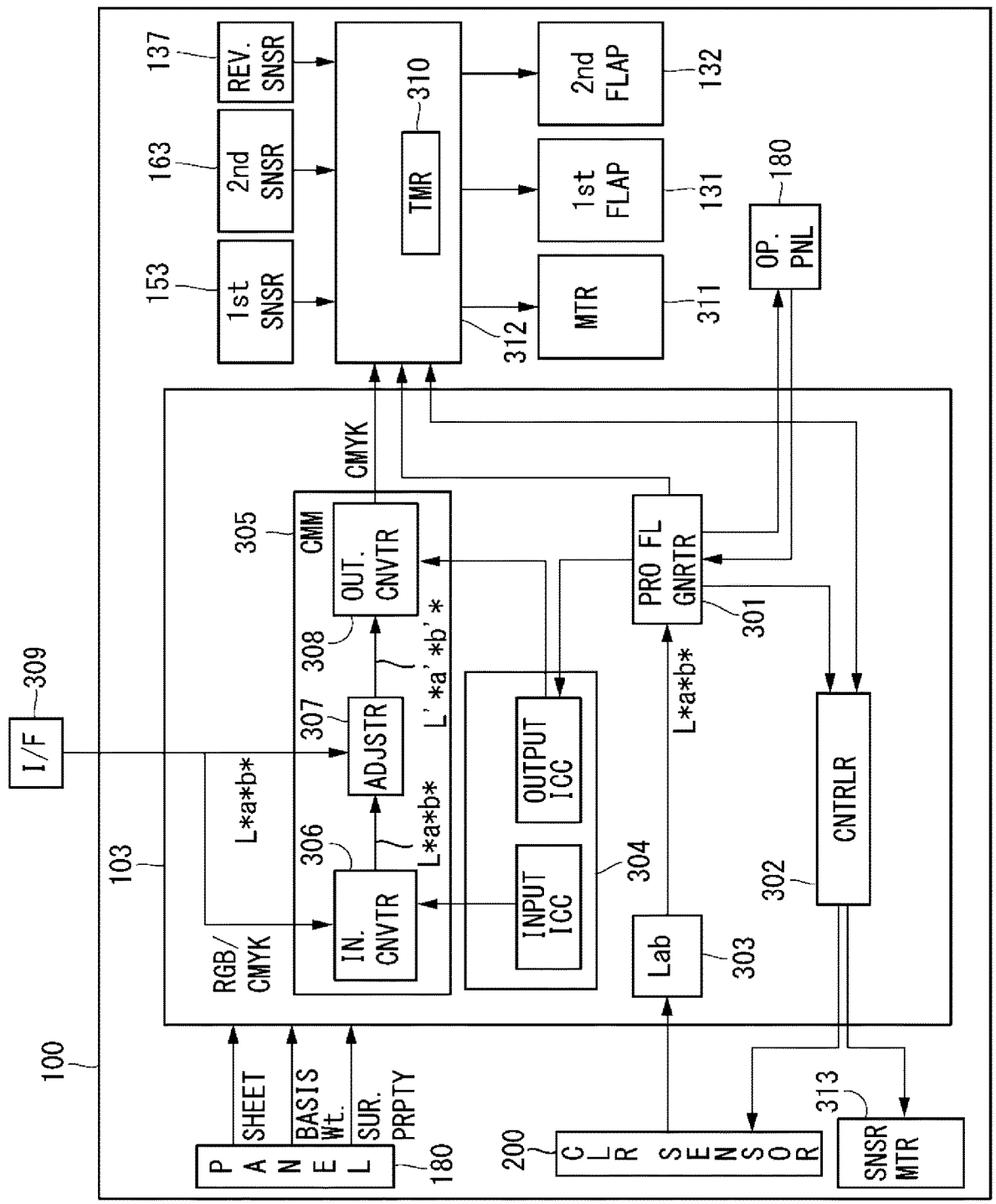
FIG. 2 is a block diagram of the system for controlling the image forming apparatus in the first embodiment.

Referring to FIG. 2, the image forming apparatus 100 is equipped with the printer controller 103 as a controlling means for integrally controlling various operations of the image forming apparatus 100. The printer controller 103 is in the form of a circuit board having at least one processor, and a memory 304. The memory 304 comprises a volatile storing apparatus such as a random access memory (RAM), and a nonvolatile memory such as a read-only memory (ROM). Not only does it serve as a storage for programs and data, but also, an operational space in which the processor performs various programs. Further, the printer controller 103 has functional portions (for example, profile generating portion 301 and CMM (color management module) for carrying out the operations which will be described later. These functional portions may be in the form of hardware such as ASIC which is independent from the image forming apparatus 100 and is removably installable in the image forming apparatus 100, or in the form of software which is a unit of programs to be carried out by the central processing unit (CPU) of the printer controller 103.

The engine control portion 312 forms an image on a sheet 1 of recording medium by making the image formation engine 102 perform the image forming operation described above, based on the command signals from the printer controller 103. For example, the engine control portion 312 controls the conveyance motor 311, a sensor movement motor 313, a first switching flap 131, and second switching flap 132 in their operation. The conveyance motor 311 comprises a group of motors for driving various rollers, with which various portions of the image forming apparatus 100 are provided. It conveys the sheet 1 by rotating the rollers.

The image forming apparatus 100 is provided with a controlling portion 180 which functions as a user interface (FIG. 1, as well). The controlling portion 180 is equipped with a display which is a means for displaying information for a user. Further, it is equipped with physical keys such as ten-keys and a print start button. The display is enabled to function as a touch panel, through which commands and data can be inputted into the image forming apparatus 100. The controlling portion 180 is operable by a user to input information regarding sheet properties such as name, basis weight, and surface treatment, into the printer controller 103. As the sheet properties are inputted, they are registered in the sheet library stored in the memory 304.

The printer controller 103 is in connection to wired or wireless external communication networks through an external interface (I/F) 309, being enabled to communicate with external computers. Further, the printer controller 103 is connectable to the control circuit of an apparatus which can be connected to the image forming apparatus 100 to function as a part of an image formation system. As examples of such an apparatus, there are an image reading apparatus which reads image information from an original, a sheet processing apparatus which performs such an operation as binding the sheets 1 on which images were formed, or the like. The printer controller 103 communicates with these apparatuses to make them coordinate with the image forming apparatus 100 in various operations.

(Color Sensor)

Figure 3:
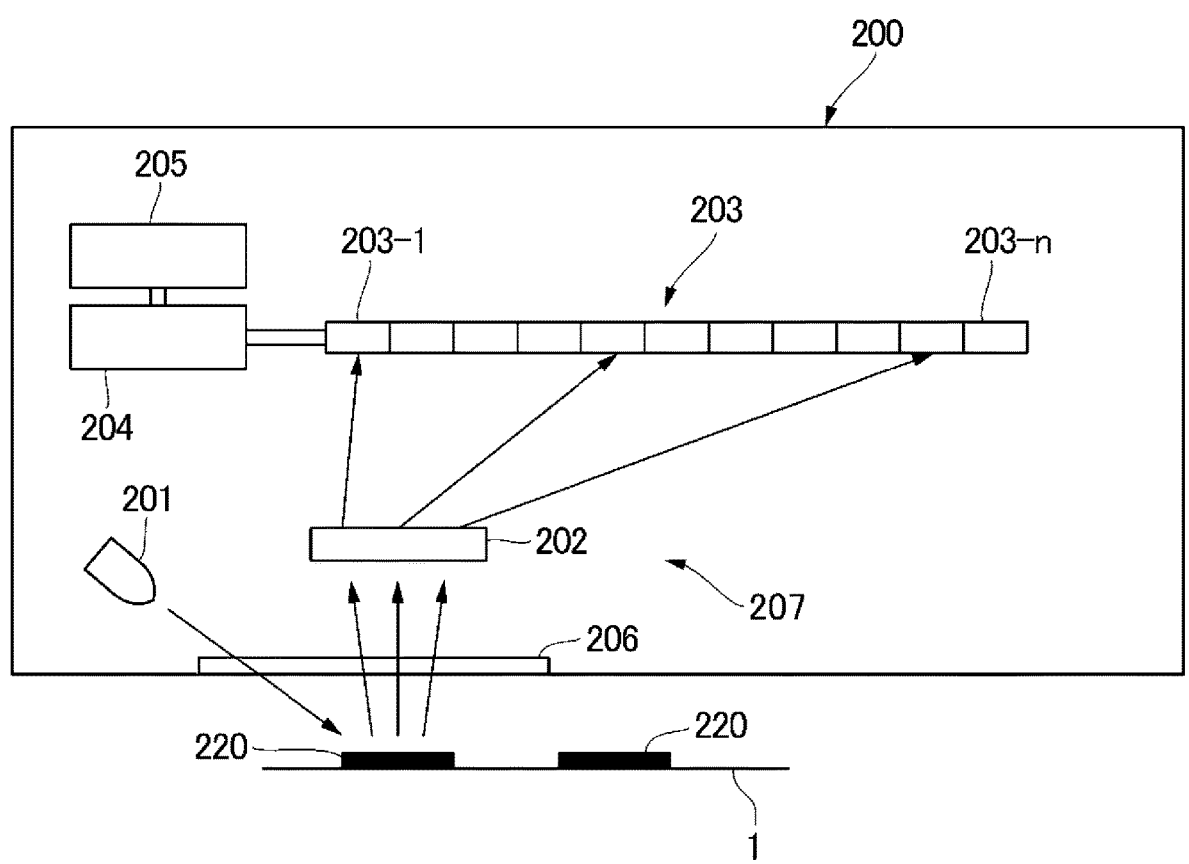
FIG. 3 is a schematic drawing of the color sensor in the first embodiment.

Next, the structure of the color sensor 200, with which the image forming apparatus 100 is provided, and the color control by the color sensor 200, are described. FIG. 3 is a schematic drawing of the color sensor 200, which is the measurement unit in this embodiment. The color sensor 200 is a sensor unit having: a light emitting portion 201 as a light source; a line sensor 203 which detects the intensity of light; and an optical system which projects the light from the light source, upon the sheet 1, and guides the light reflected by the sheet 1, to the line sensor 203. The light emitting portion 201 in this embodiment is a white LED. It is for shedding such white light that is continuous in spectrum, upon the sheet 1. The diffraction grating 202 in this embodiment, which is a spectroscopic element, separates the light reflected by the test patches 220 (images) into monochromatic lights which are different in wave length.

The line sensor 203 comprises image sensing elements 203-1, ... 203-n, which have n picture elements. It measures in intensity, each of the monochromatic lights, into which the light reflected by the sheet 1 was separated by the diffraction grating 202. In terms of wavelength, the line sensor 203 can detect the entire range of visible light, in practical terms. For example, the range of the line sensor 203 is set to 380 nm-720 nm. As the light sensing elements 203-1, ... 203-n, CMO sensors can be used. By the way, in the case of the sensor 203 structured as illustrated, it is provided with a lens 206 which condenses the light reflected by the patches (images) onto the line sensor 203. The line sensor 203, and the optical system which guides the light reflected by the sheet 1, to the line sensor 203, make up the detecting portion 207 of the color sensor 200 in this embodiment.

The detection signals from the line sensor 203 are processed by a computing portion 204 mounted in the color sensor 200. The results of the computation are stored in a memory 205. The computing portion 204 has a computing portion which calculates the spectral reflectance of each patch (image) from the detected intensity of the reflected light.

(Color Management System)

Next, the method for managing the image forming apparatus 100 in the colors of the images it outputs, by feeding the results of the measurement by the color sensor 200, back into the image forming apparatus 100, is described. In this embodiment, ICC (International Color Consortium) is used. ICC has been accepted as a profile which is excellent in color reproduction, and has been widely accepted in the marked. However, any of the other color management systems may be employed in place of ICC. For example, it is possible to use CRD (Color Rendering Dictionary) in PostScript (registered trade mark) proposed by Adobe, Co., Ltd.), or the color separation table of Adobe Photoshop (registered trade mark). Further, it is possible to use CMYK simulation, which is one of the functions of ColorWise (registered trade mark) of EFI Co, Ltd.) which maintains monochromatic (black-and-white) data.

Figure 5:
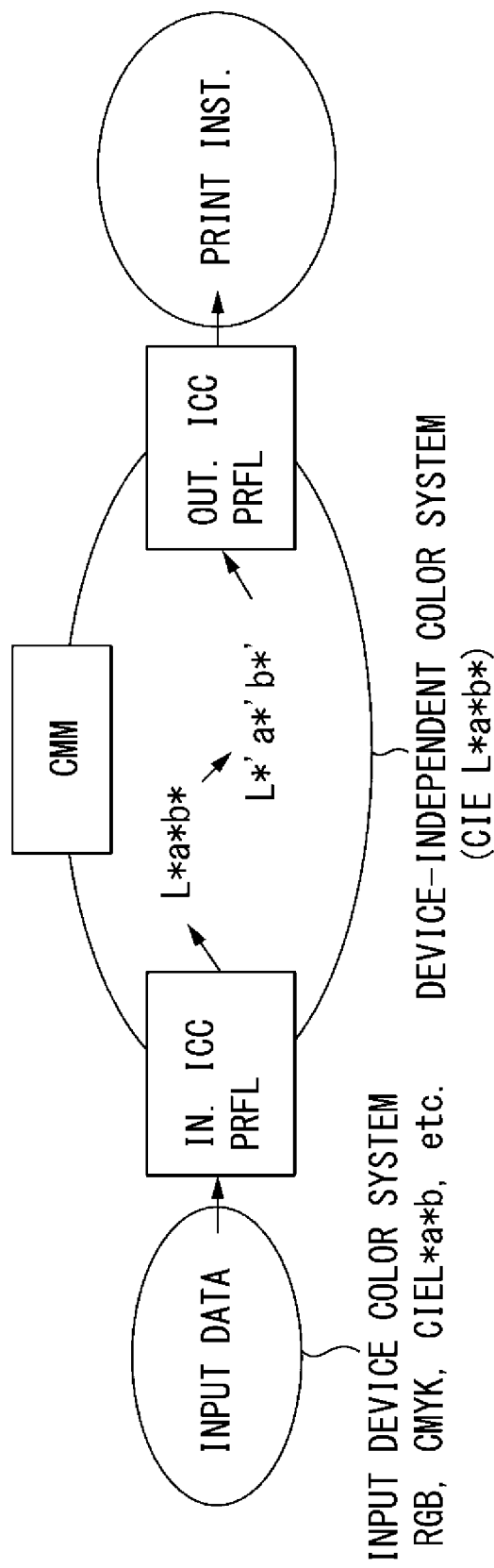
FIG. 5 is a conceptual drawing for describing the role of the color management module.

FIG. 5 is a conceptual drawing for describing the color management by CMM (color management module). There is no guarantee that image data which are inputted into the image forming apparatus 100 are based on the color expression in L*a*b* color space. They can be expressed in one of such data forms as RGB, CMYK, CIE, XYZ, ETC, etc. Further, even if two sets of image data are the same in data format, it is possible that the two will be different in the perceptive color of the original image to be reproduced by the image forming apparatus 100.

Therefore, CMM converts the inputted image data into L*a*b* data expressed in device-independent color space (CIE L*a*b* color space, in this embodiment). Then, CMM generates commands (CMYK signals) for making the image formation engine 102 form images, based on L*'a*'b*' data created by performing necessary correction on L*a*b* data. What is used for converting from the color system of the input device, into L*a*b* color space during this process is an input ICC profile. Further, what is used for converting from L*a*b* color space into the color space (space for values assumable by CMYK signals) for the image formation engine 102 is the output ICC profile. By the way, in this embodiment, CIE L*a*b* space is used as the device-independent color space. However, another color space (CIE1931 XYZ color space, for example) may be used instead.

By the way, CMYK signals are what define the exposure levels for the laser scanner portion 107 of each of the stations 120-123, which correspond to yellow, magenta, cyan and black colors, respectively. That is, the values of the CMYK signals correspond to the toner density levels for each picture element of the monochromatic images to be formed by the stations 120-123. The CMYK signals are inputted as video signals, into the laser scanner portion 107, after being transmitted from the printer controller 103 to the engine control portion 312.

(Measurement by Color Sensor)

Since the image forming apparatus 100 in this embodiment is equipped with the color sensor 200, it is capable of creating its own output ICC profile. The output ICC profile is a color conversion profile which shows the correlation between the CMYK signals for the image formation engine 102 and the color of the actual images formed on a sheet 1 of recording medium by the image formation engine 102.

The process for creating an output ICC profile for the image forming apparatus 100 is as follows: First, patches (images) are formed on a sheet 1 of recording medium, in a preset pattern, by the image forming apparatus 100. That is, images for color measuring are formed in a specific pattern, on the sheet 1. The sheet 1 having the test patches is sent to the reversal pass 135, and the patches are measured in spectral reflectance by the color sensor 200. That is, the beam of light, which was emitted from the above described light emitting portion 201 and reflected by a specific patch on the sheet 1, is diffused by the diffraction grating. Then, the line sensor 203 measures the reflected light in intensity.

(Determination of Coordinate of Color of Patch in Color Space)

Next, the method for calculating the coordinate of the color of each patch in the device-independent colors pace (L*a*b* color space defined by CIE), based on the spectral reflectance obtained by the color sensor 200 is described. The coordinate of the color of the test patch in L*a*b* color space can be calculated from the spectral reflectance through a procedure which is in accordance with ISO 13655, as will be shown next.

a. Obtain the spectral reflectance $R(\lambda)$. ($\lambda$: 380 nm-780 nm)

b. Prepare color-matching functions $x(\lambda)$, $y(\lambda)$, $z(\lambda)$, and spectral distribution of standard light SD50 $(\lambda)$.

By the way, color-matching function is defined by JIS Z8701. SD50 $(\lambda)$ is defined by JIS Z8720, and is sometimes referred to as auxiliary standard illuminant D50. Further, ordinarily, $x(\lambda)$, $y(\lambda)$, $z(\lambda)$ is provided with an overline. However, the overline is not shown in the following description.

c. Spectral reflectance $R(\lambda)$, color-matching function $x(\lambda)$, $y(\lambda)$, $z(\lambda)$, and spectral distribution of standard light SD50 $(\lambda)$ are multiplied together for each wavelength range.

$R(\lambda) \times SD50(\lambda) \times x(\lambda)$
$R(\lambda) \times SD50(\lambda) \times y(\lambda)$
$R(\lambda) \times SD50(\lambda) \times z(\lambda)$ d. Obtain the total of the products obtained in (c).

$\Sigma\{R(\lambda) \times SD50(\lambda) \times x(\lambda)\}$
$\Sigma\{R(\lambda) \times SD50(\lambda) \times y(\lambda)\}$
$\Sigma\{R(\lambda) \times SD50(\lambda) \times z(\lambda)\}$ e. Obtain the total of products of color-matching function $y(\lambda)$ and spectral distribution $SD50(\lambda)$ of standard color.

$\Sigma\{SD50(\lambda) \times y(\lambda)\}$ f. Calculate coordinate in XYZ color space.

$X = 100 \times \Sigma\{SD50(\lambda) \times y(\lambda)\} / \Sigma\{R(\lambda) \times SD50(\lambda) \times x(\lambda)\}$
$Y = 100 \times \Sigma\{SD50(\lambda) \times y(\lambda)\} / \Sigma\{R(\lambda) \times SD50(\lambda) \times y(\lambda)\}$
$Z = 100 \times \Sigma\{SD50(\lambda) \times y(\lambda)\} / \Sigma\{R(\lambda) \times SD50(\lambda) \times z(\lambda)\}$ g. Convert XYZ coordinate obtained in (f) into the coordinate in L*a*b* color space.

$L^* = 116 \times (Y/Y_n)^{\wedge}(1/3) - 16$
$a^* = 500\{(X/X_n)^{\wedge}(1/3) - (Y/Y_n)^{\wedge}(1/3)\}$
$b^* = 200\{(Y/Y_n)^{\wedge}(1/3) - (Z/Z_n)^{\wedge}(1/3)\}$ In (g) given above, $X_n$, $Y_n$ and $Z_n$ are values (three-stimulus values of standard light) which represent the coordinate of white color as a referential point. By the way, the formula given above are conversion formulas when $Y/Y_n \geq 0.008856$. For the area where $Y/Y_n < 0.008856$, they are replaced as follows:

$(X/Xn)\wedge(1/3) \rightarrow 7.78(X/Xn)\wedge(1/3)+16/116(Y/Yn)\wedge(1/3) \rightarrow 7.78\ (Y/Yn)\wedge(1/3)+16/116(Z/Zn)\wedge(1/3) \rightarrow 7.78(Z/Zn)\wedge(1/3)+16/116$ (Profile Creation Process)

Next, the contents of the process through which the image forming apparatus 100 creates ICC profile is described. A user can make the image forming apparatus 100 carry out the profile creation process as necessary by giving an explicit command through the controlling portion 180. For example, it is possible that the profile creation process will be carried out after one or more components of the image forming apparatus 100 were replaced by a customer service engineer, before an image formation job which requires a high level of color reproducibility is started, and also, in a case where a user wants to know the tone of the final print while an image is designed.

Referring to FIG. 2, as a command for creating ICC profile is inputted through the controlling portion 180, a signal for profile creation is inputted into the profile creating portion 301 of the printer controller 103. The profile creating portion 301 transmits the CMYK signals for outputting the 928 patch test form (CMYK color chart) defined in ISO 12642, to the engine control portion 312, without performing the color conversion by the output ICC profile. That is, in this embodiment, the test form defined in ISO 12642 is used as the images for the color management. In parallel to the transmission of the CMYK signals, the profile creating portion 301 sends a command (color measurement command) for measuring the test form, to the color sensor controlling portion 302. The color sensor controlling portion 302 makes the color sensor 200 move in the primary scan direction, with the use of a sensor movement motor 313, and also, makes the color sensor 200 measure the color of the patch (image) on the test form.

The image forming apparatus 100 forms a test form on a sheet 1 of recording medium, based on the CMYK signals inputted into the engine control portion 312. After the formation of the test form on the sheet 1, the sheet 1 is conveyed to the reversal pass 135, in which the color of the test form is measured by the color sensor 200. The spectral reflectance data of each of the 928 patches, the color of which was measured by the color sensor 200, are given to the Lab computing portion 303 of the printer controller 103, and then, are converted into the L*a*b* color space data by the L computing portion 303.

The profile creating portion 301 creates the output ICC profile, based on the relationship between the CMYK signals transmitted to the engine control portion 312, and the results of the color measurement by the color sensor 200. Further, the profile creating portion 301 replaces the current output profile in the memory 304 with the newly created output ICC profile.

The output ICC profile is structured as shown in FIG. 4, for example. It comprises a header, a tag, and data. The profile creating portion 301 creates a CMYK→L*a*b* conversion table (A2Bx Tag), based on the CMYK signals used to output the test form, and the L*a*b* values obtained from the results of the color measurement. Based on this conversion table, L*a*b*→CMYK reversal conversion table (A2Bx Tag) is created. As tags for the other data, the white color point (wtpt), the tag (gamt) which indicates whether a certain color is within, or outside, the color range of the hard copy which the image forming apparatus 100 outputs, etc., are also stated in the output ICC profile.

By the way, the image forming apparatus 100 may be designed so that in a case where a command for making the image forming apparatus 100 carry out the profile creation process, which was inputted through the external I/F 309, was inputted, the profile creating portion 301 transmits the ICC profile created by the profile creating portion 301, to the external devices which transmitted the command. In such a case, the image forming apparatus 100 may be designed so that the color conversion by the application which corresponds to the ICC profile, can be done by a user with the use of the external device.

$$\Delta E = ((L1-L2)\wedge 2 + (a1-a2)\wedge 2 + (b1-b2)\wedge 2)\wedge(1/2).$$

(Color Conversion Process)

Next, the color conversion process which is performed on the input image data as the image forming apparatus 100 is given an image formation job is described. Referring to the block diagram in FIG. 2, the image data which the printer controller 103 received through the external I/F 309 are inputted into the CMM 305. In an ordinary color printing operation, the image data are frequently in the form of standard printing CMYK signals such as RGB values and JapanColor. In such cases, the input side color space converting portion 306 converts the input image data into L*a*b* data by performing RGB→L*a*b* color conversion, or CMYK→L*a*b* color conversion, with reference to the input ICC profile stored in the memory 304. The input ICC profile comprises the one-dimensional LUT (look-up table) for controlling the input signals in gamma, multi-dimensional LUT which is referred to as direct mapping, and one-dimensional LUT which controls the generated data in gamma.

The correcting portion 307 of the CMM 305 makes necessary correction on the L*a*b* data to correct the image forming apparatus 100 in the tone in which the image forming apparatus 100 output images. As an example of the correcting process, GAMUT conversion may be mentioned, which corrects the mismatch between the color range of the input device, and the color range which the image forming apparatus 100 can reproduce. As another example, such color conversion may be mentioned that corrects the image forming apparatus 100 in the mismatch between the light source on the input side, and the light source used to observe the prints outputted by the image forming apparatus 100 (this mismatch is sometimes referred to as color temperature setting mismatch). As yet another example, the character identification process for finding the characters in a color image to change the characters in color to give the characters appropriate color. The L*a*b* data are converted into the L*'a*'b*' data through these correction processes. Further, the correcting portion of the CMM 305 converts the input image data inputted through the external I/F 309, into the L*'a*'b*' data by correcting the data as necessary, even if the data are expressed in the L*a*b* color space.

The output side color space converting portion 308 converts the L*'a*'b*' data into the CMYK signals by performing the L*a*b*→CMYK color conversion, with reference to the output ICC profile stored in the memory 304. During this process, if the output ICC profile is renewed by the profile creating portion 301, the CMYK signals generated after the renewal become different from the CMYK signals generated before the renewal, even if both are the same in the L*'a*'b*' data. That is, the output ICC profile, which is image formation setting for the image forming apparatus 100, is changed according to the results of the color measurement by the color sensor 200, which is the measuring unit in this embodiment.

(Controlling Method)

Figure 6:
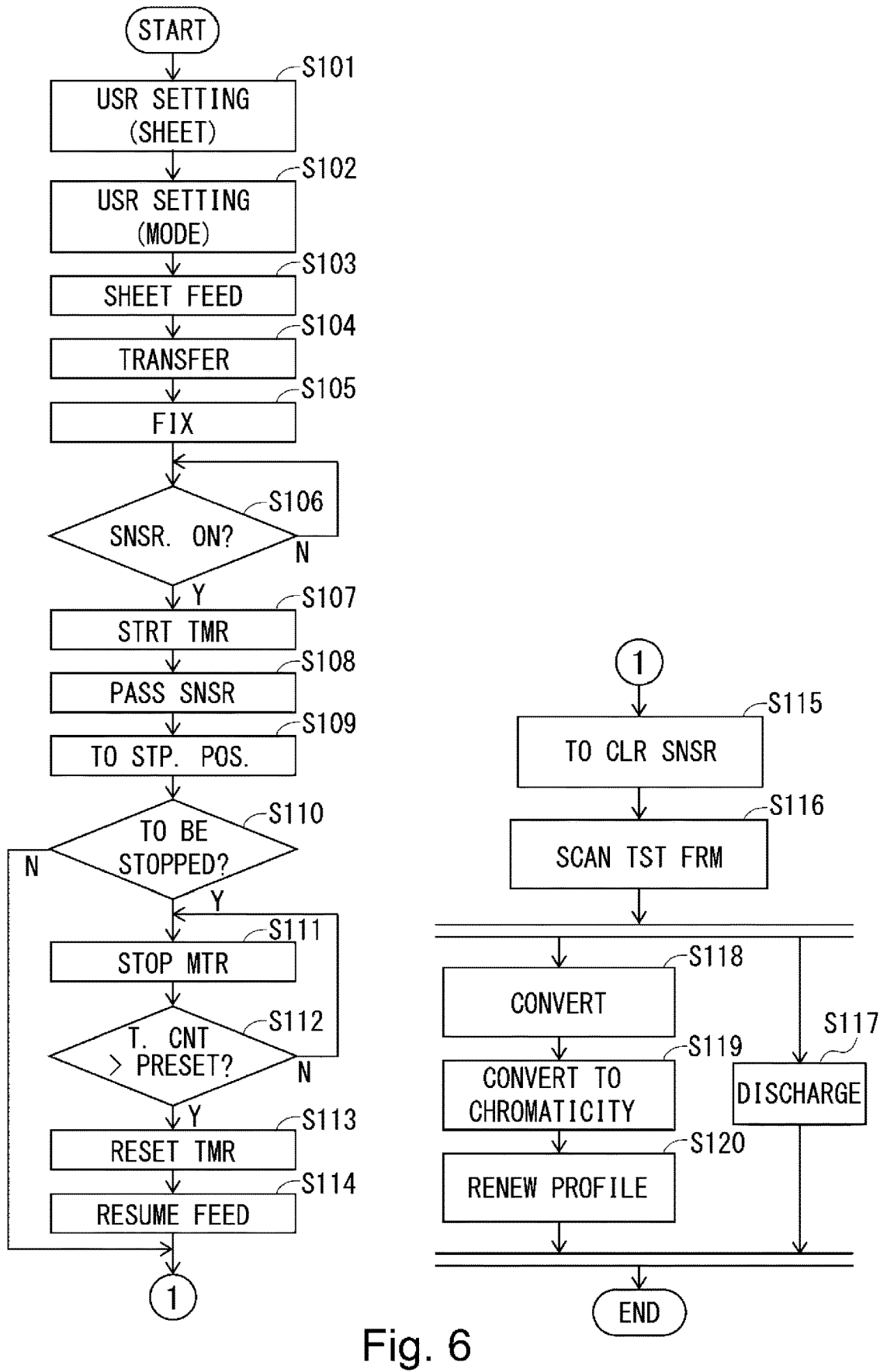
FIG. 6 is a flowchart of an example of control sequence of the image forming apparatus in the first embodiment, in the color correction mode.

Next, referring to FIGS. 6 and 7, the operation which is carried out by each element, shown in FIG. 3, of the image forming apparatus 100 structured as described above, when the apparatus 100 is in the tone correction mode, is described. FIG. 6 is a flowchart which shows the method for controlling the image forming apparatus 100 in the tone correction mode. Parts (a), (b) and (c) of FIG. 7 illustrate the sheet position in the tone correction mode. By the way, it is assumed here that in this embodiment, the image forming apparatus 100 is operated in the toner correction mode, in response to an explicit command from a user. However, the image forming apparatus 100 may be designed so that as the image forming apparatus 100 detects that new sheets of recording medium were set in the sheet storage 113, or the like situation, the image forming apparatus 100 automatically operates in the tone correction mode.

In a case where a user wants to operate the image forming apparatus 100 in the tone correction mode, the user is to input information regarding the properties (type, basis weight, presence or absence of surface treatment, etc.) of the sheet of recording medium which is the target of the output ICC profile, through the controlling portion 180, in advance (S101). As the printer controller 103 of the image forming apparatus 100 receives the command for making the image forming apparatus 100 operate in the tone correction mode (S102), it makes the image forming apparatus 100 sequentially carry out steps S103-S120, in coordination with the engine control portion 312 and color sensor 200.

To begin with, as a single sheet 1 of recording medium is fed into the main assembly of the image forming apparatus 100 from the sheet storage 113 (S103), a toner image is transferred onto the sheet 1, under the transfer condition set according to the inputted sheet properties (S104). During these steps, the engine control portion 312 makes a test form based on the CMYK signals sent from the profile creating portion 301, and transfers the test form onto the sheet 1. Then, the sheet 1 having the transferred test form is conveyed to the first fixing device 150, by which the test form is fixed to the sheet 1 under the fixation condition set according to the sheet properties (S105). Although it depends on sheet type, the sheet 1 may be conveyed further to the second fixing device 160 to be made to appear glossy.

As the first post-fixation sensor 153 or second post-fixation sensor 163 detects the sheet 1 (S106: Y), counting is started by a timer 310, with which the engine control portion 312 is provided (S107). The timer 310 is used to ensure that a sufficient length of cooling period is provided after the ending of the fixation, in order to prevent the color sensor 200 from being reduced in measurement accuracy by thermochromism.

The length T of cooling period varies depending on sheet type. The value for the length T of cooling period is set to ensure that the difference ΔE between the color of the sufficiently cooled image, and the color of the image which is being cooled since the counting by the timer 31 is started, falls below a preset value (ΔE<1.5 for example). That is, the toner image heated by fixation becomes stable in color as the preset length T of time elapses after the fixation. By the way, the values T which were obtained for each type of sheet through experiments in advance are stored in the nonvolatile storing apparatus of the printer controller 103. However, in a case where the sheet 1 of recording medium used for a given image forming operation is of such a type that it is unlikely to allow the toner image thereon to change in tone, such information (T=0, for example) that indicates that it is unnecessary to keep the image forming apparatus 100 on standby to cool the sheet 1, is stored in the storing apparatus. By the way, in this embodiment, the target value for the color measurement accuracy level is set to 1.5 (ΔE=1.5).

After the starting of the counting by the timer 310, the sheet 1 is conveyed through the reversal pass 135, being thereby made to pass by the color sensor 200 (S103, part (a) of FIG. 7). At this point in time, the measuring operation by the color sensor 200 is not carried out, and the sheet 1 is conveyed to a preset standby position (reversing portion 136, in this embodiment) (S109, part (b) of FIG. 7). In a case where the sheets 1 of recording medium, which was selected by a user, does not require the cooling period (S110: N), a drive command is issued to the conveyance motor 311 so that the sheet 1 is conveyed toward the color sensor 200, without being kept on standby at the standby-point (S115). In a case where the sheet 1 of such a type that requires a cooling period (S110: Y), the conveyance motor 311 is stopped while the sheet 1 is at the standby point (S111). Then, as the count value in the timer 310 exceeds the preset value T (S112: Y), the timer 310 is reset to zero (Sheet storage 113), and the driving of the conveyance motor 311 is restarted (S114). Thus, the sheet 1 begins to be conveyed toward the color sensor 200 (S115).

Through the above described steps S111-S114, the sheet 1 which requires the cooling period reaches the color sensor 200 after the elapse of at least the preset length T of time. By the way, in reality, there is a certain amount of delay between the restarting of the driving of the conveyance motor 311, and the arrival of the sheet 1 at the color sensor 200, in addition to the preset length T. Practically, however, this delay has no effect on the measurement accuracy.

As the sheet 1 reaches the color sensor 200, the test form on the sheet 1 is scanned by the color sensor 200, which is being moved by the sensor movement motor 313 in the primary scan direction (sheet width direction) (S116). More specifically, the test form has multiple patches (images) arranged in rows and columns like tiles. The color sensor 200 detects the color of each patch in a given row of patches, while being moved in the primary scan direction, while the sheet 1 is kept stationary under such a condition that the given row of patches opposes the color sensor 200. As soon as the process of measuring the color of each patch in the given row of patches is completed, the sheet 1 is moved in the secondary scan direction (which is parallel to sheet conveyance direction in reversal pass 135) by a pair of conveyance rollers 141, and a pair of conveyance rollers 142 (FIG. 1) to a point at which the next row of patches opposes the color sensor 200. Then, the color sensor 200 is stopped at this point. This operation is repeated for each point on the test form. Consequently, the color of each patch on the test form is detected.

As for the measuring method for detecting the color of the patches while moving the color sensor 200 in the primary scan direction, it may be either a scan method or a spot method. A scan method is such a method that sends a color detection command to the color sensor 200 in synchronism with the sending of a drive command to the sensor movement motor 313, while continuously moving the color sensor 200 in the primary scan direction. In the case of this method, the detection signals by the line sensor is obtained with such timing that the color sensor 200 is corresponding in position to each patch. A spot method is such a measuring method that repeats a process that temporarily stops the sensor movement motor 313 when the color sensor 200 is at a point which corresponds in position to one of the patches, and then, moves the color sensor 200 to another point at which it corresponds in position to the next patch, as soon as the detection signal from the line sensor is obtained.

Whichever measuring method is employed, it is compatible with the structure of the color sensor 200 which will be described later.

The detection signals outputted for each patch from the line sensor 203 (FIG. 3) are converted into spectral reflectance by the computing portion 204 (S118), and are given to the Lab computing portion 303 of the printer controller 103. Lab computing portion 303 converts the spectral reflectance of each patch into a coordinate (chromaticity) in L*a*b* color space, and inputs the coordinate into profile creating portion 301 (S119). The profile creating portion 301 creates the output ICC profile, based on the correlation between the CMYK signals used for the test form formation, and the chromaticity received from the Lab computing portion 303. Then, it replaces the output ICC profile in the memory 304 with the newly created profile (S120).

In parallel to the progression of the above described data processing, the sheet 1, which has just gone through the color measuring operation by the color sensor 200, is discharged out of the image forming apparatus 100 through the discharge pass 139 (S117, part (c) of FIG. 7).

(Details of Color Sensor)

Next, the properties of the color sensor 200, and the structural arrangement for moving the color sensor 200, are described in detail. In the following description of these subjects, the moving direction (primary scan direction) of the color sensor 200 is referred to as X direction, and the direction which is perpendicular to the primary scan direction is referred to as Y direction. Further, the direction which is perpendicular to both X and Y directions is referred to as Z direction. Assuming that the portion of the sheet 1 of recording medium, which is facing the color sensor 200, and therefore, is the target of the detection by the color sensor 200 flat, Z direction is parallel to the normal line to the surface of this portion of the sheet 1.

Each part in FIG. 8 is for describing the relationship between the tilting of the color sensor 200, and the amount of the light which is incident to the detecting portion 207 of the color sensor 200. Referring to part (b) of FIGS. 8 and 8(c), as the beam of light hits the sheet 1, it is scattered by the sheet 1. The image forming apparatus 100 is structured so that the detecting portion 207 catches the portion of the scattered light, which is roughly parallel to Z direction.

That is, in this embodiment, the image forming apparatus 100 is structured so that if the color sensor 200 is not tilted, the ray of light (which hereafter is referred to as optical axis), which represents the beam of light which the detecting portion 207 catches, becomes parallel to Z direction.

On the other hand, the light emitting portion 201 is disposed away from the detecting portion 207 by a certain distance in terms of Direction X, and is disposed in such an attitude that it is tilted relative to Z direction. Therefore, the direction of the beam of light emitted by the light emitting portion 201, that is, the optical axis of the light emitting portion 201, is inter-sectional to Z direction, as seen from Y direction (point of view in part (b) of FIG. 8). By the way, in terms of Y direction, the light emitting portion 201 and detecting portion 207 overlap with each other. As the image forming apparatus 100 is seen from X direction (point of view in part (c) of FIG. 8), the optical axis of the light emitting portion 201, and that of the detecting portion 207, are parallel to Z direction.

In order for the detecting portion 207 to be able to measure at a level of accuracy, which is higher than a preset one, the amount of the light which the detecting portion 207 catches has to be within a certain range. In order for the detecting portion 207 to catch the amount of light which is greater than the certain amount, the tilting of the color sensor 200 has to be within a certain range. However, the tilt θx of the color sensor 200 in X direction is the same as the angle of the optical axis of the color sensor 200 relative to Z direction (ratio of amount by which the tilt of color sensor 200 increase or decrease in X direction, relative to the increase in Z direction) (that is, angle of optical axis relative to Z axis as seen from Y direction). Similarly, the tilt θy of the color sensor 200 in X direction is the same as the angle (of optical axis of relative to Z axis as seen in X direction), which is the ratio of the increase or decrease of the angle (tilt) of the color sensor 200 in Y direction, relative to the amount of the increase in the angle of the color sensor 200 in Z direction.

Referring to FIGS. 8(d) and 8(e), the tolerance for the tilt θx in X direction, is greater than that for the tilt θy in Y direction. In other words, referring to part (a) of FIG. 8, a width x1 in X direction, of the detection range S, in which the reflected light is detectable by the detecting portion 207 is wider than the width y1, in Y direction, of the detection range S. Further, roughly speaking, in the case of the color sensor 200, in this embodiment, structured as described above, the tolerance for the tilt θ of the color sensor 200 relative to the directions perpendicular to Z direction is widest in X direction.

Referring to each parts FIG. 9, in this embodiment, the color sensor 200 is positioned so that the direction which is wider in the tolerance for the tilt θ of the color sensor 200 roughly coincides with the primary scan direction (X direction) of the color sensor 200, even in consideration of manufacture errors and the like. Part (a) of FIG. 9 is a schematic drawing of the color sensor 200 and its adjacencies, as seen in Z direction. Part (b) of FIG. 9 is a sectional view of the color sensor 200 as seen in Y direction. Part (c) of FIG. 9 is a sectional view of the color sensor 200 as seen in X direction.

Referring to part (a) of FIG. 9, the color sensor 200 is a unit comprising a flat holding member 252, and a sensing board 210 attached to the member 252. The sensing board 210 comprises a light emitting portion 201 and the detecting portion 207. The image forming apparatus 100 is structured so that the color sensor 200 is reciprocally movable in X direction, along a pair of guide rails 250 and 250. The sensing board 210 is attached to the holding member 252, being positioned so that the longer edges of the area S which is rectangular as described bellow, and allows the color sensor 200 to detect the reflected light, is parallel to X direction (that is, direction in which optical axis of light emitting portion 201 extends as seen in Y direction).

In this embodiment, the guide rails 250 and 250 are supporting means. The guide rails 250 as the first guiding member, and the guide rail 250 as the second guiding member, are in the form of a piece of shaft. They are positioned so that they extend in parallel to X direction, which is parallel to the primary scan direction of the color sensor 200. The lengthwise ends of the holding member 252 in terms of Y direction is fitted with a pair of cylindrical sliders 251 and 251 which are in engagement with the guide rails 250 and 250, one for one. One of the sliders 251 is the first engaging portion which engages with the first guiding member, whereas the other slider 250 is the second engaging member which engages with the second guiding member 250. By the way, the image forming apparatus 100 may be differently structured from the one in this embodiment so that it is provided with only one guiding member, and one engaging portion which engages with this singe guiding member.

The holding member 252 is in connection to the sensor movement motor 313 by way of the driving force transmitting means such as a timing belt. It is moved in X direction by the driving force from the sensor movement motor 313. The combination of the sensor movement motor 313 and timing belt is an example of means for moving the color sensor 200 in this embodiment. By the way, the image forming apparatus 100 does not need to be structured so that the color sensor 200 is moved by the driving force from a power source which is outside the color sensor 200. For example, the sensor movement motor 313 may be attached to the holding member 252 so that the color sensor 200 moves on the supporting means such as guide rails, with its own power (from its internal power source).

Referring to part (b) of FIG. 9, the tilt Ox of the color sensor 200 in X direction corresponds to the angle of the slider 251 relative to the axial line of the guide rail 250. Further, referring to part (c) of FIG. 9, the tilt θy of the color sensor 200 in Y direction corresponds to the amount by which the holding member 252 is tilted by the displacement of the pair of sliders 251 and 251 in Z direction.

When the color sensor 200 measures the color of the patch, it is reciprocally moved in X direction. Therefore, it is possible that the color sensor 200 will be accelerated in X direction, which in turn makes it possible that the color sensor 200 tilts in X direction. In this embodiment, therefore, the color sensor 200 is positioned so that the direction which is greater in the tolerance for the tilting of the color sensor 200 coincides with the primary scan direction of the color sensor 200. That is, in this embodiment, image forming apparatus 100 is structured so that the amount by which the color sensor 200 is allowed to tilt is dependent upon the direction in which the color sensor 200 tilts. That is, the color sensor 200 is positioned so that the angle θx by which the color sensor 200 is allowed to tilt in the scanning direction (X direction) is greater than the angle θy, by which the color sensor 200 is allowed to tilt in the direction (Y direction) which is perpendicular to the primary scan direction. Therefore, even if the color sensor 200 slightly tilts in the primary scan direction, it is unlikely to be affected in measurement accuracy. That is, this embodiment can provide an image forming apparatus which is stable in the measurement accuracy of its color sensor.

Generally speaking, a spectral colorimeter, like the one in this embodiment, which is structured so that it measures the light reflected by a sheet of recording medium by separating the reflected light with the use of its spectroscopic elements is higher in measurement accuracy than a reflection colorimeter. It is, however, inferior in terms of depth of field. By the way, a reflection colorimeter measures the color of an object by detecting the intensity of the light which was projected upon the object from one of the three light sources (different in color of light they emit) and was reflected by the object. If a colorimeter is less in depth of field, it is likely to be less in measurement accuracy because of the positional deviation of the sensor from the object, the color of which is to be measured. Even a spectral colorimeter can be made less influenced by the positional deviation of the color sensor 200 relative to the object to be measured, by being structured so that it is greater in the depth of field. However, increasing a spectral colorimeter in the dept of field increases the spectral colorimeter in size and cost.

In comparison, in this embodiment, the image forming apparatus 100 is structured so that the effects of the tilt of the color sensor 200 attributable to the movement of the color sensor 200 can be minimized by the positioning of the color sensor 200. Therefore, it is possible to provide a color sensor 200 which is high in measurement accuracy, and yet, is no greater in size and cost than any conventional one.

By the way, referring to part (a) of FIG. 10 and part (b) thereof, the distance L1 (between the two guide rails 250 (distance between axial line of one of guide rails 250 and that of the other)) is set to be greater than the length L2 of the physical engagement between the slider 251 and guide rail 250. The length L2 of engagement of the slider 251 is the length of the area of contact between the inward surface of the slider 251 and the peripheral surface of guide rail 250, in terms of Y direction. In a case where the left slider 250 and right slider 251 are different in the length L2, the value of length L2 points to the greater one.

Therefore, in a case where the color sensor 200 tilts in Y direction as shown in part (c) of FIGS. 10-10(f), the maximum value Θy (angle at which θy=g/L1) of the tilt θy is smaller than the maximum value Θx (angle at which tan Θx=g/L2) by which the color sensor 200 tilts in X direction. In other words, in this embodiment, the image forming apparatus 100 is structured so that as far as Y direction, which can be made smaller in the tolerance for the tilting of the color sensor 200, by the properties and positioning of the color sensor 200, is concerned, tilting itself in Y direction can be made smaller than the tilting in X direction, by the structural arrangement for supporting the color sensor 200.

FIG. 11 is a graph which shows the relationship (tan θ=g/L) between the amount of the tilt θ attributable to the gap g, and the length L (distance L1 between two guide rails, or length L2 of the contact between the slider 251 and rail 250, based on three values (unit of measurement: mm) of the gap g. As shown in the graph, as long as the gap g remains stable in value, the smaller the L, the greater the tilt θ. Therefore, it is reasonable to think that the color sensor 200 can be controlled (reduced) in its tilt θ by controlling the length L1 and/or length L2.

However, the color sensor 200 comprises the light emitting portion 201, detecting portion 207, etc. Therefore, as long as the holding member 252 is supported by the guide rails 250 and 250, by its lateral edge portions, there is a limit to the reduction of the guard rail gap L1. Further, increasing the engagement length L2 of the slider 251, and/or reducing the gap g leads to increase in material cost, or makes it necessary to reduce the sliders 251 in internal diameter, and the guide rails 250 and 250 in external diameter, in tolerance. Therefore, it is concerned that such measures will increase the color sensor 200 in processing cost, and also, reduce the manufacturing facility for the color sensor 200 in productivity.

In this embodiment, the tolerance for the tilt θx of the color sensor 200 in terms of x direction, and the tolerance for the tilt θy in terms of Y direction, are both set to be no more than a preset value, for example, 1□. The engagement length L2 for the slider 251, and the gap g, which can satisfy both the cost requirement and productivity requirement, are in a range of 5-10 [mm], and a range of 0.05-0.1 [mm], respectively. With the color sensor 200 being structured in this manner, the tilt θx of the color sensor 200, that is, the tilt of the color sensor 200 in X direction, falls within a range of ±1° at most.

On the other hand, as long as the relationship between L1 and L2 satisfies L1>L2, the maximum value θy of the tilt of the color sensor 200 in Y direction is smaller than the maximum value Θx of the tilt of the color sensor 200 in X direction. Therefore, even in a case of the color sensor 200 in this embodiment, which is structured so that the tolerance for the tilt of the color sensor 200 in Y direction, that is, the primary scan direction, is less than the tolerance for the tilt θx of the color sensor 200, that is, the tilt in X direction, it can be avoided that the tilt θy of the color sensor 200, that is, the tilt in Y direction, exceeds the tolerance for the tilting of the sensor. Therefore, it is possible to keep the color sensor 200 highly accurately positioned relative to a sheet of recording medium, which is the object of detection. That is, this embodiment of the present invention can contribute to the improvement of the color sensor 200 in terms of measurement accuracy.

Embodiment

In the first embodiment described above, the direction of the long edge of the area in which the light reflected by the sheet 1 of recording medium is accurately detectable by the detecting portion 207 of the color sensor 200 coincided with the primary scan direction. However, it is not mandatory that the direction in which the length of the area of detection is greatest coincides with the primary scan direction. That is, in a case where the area S of detection is rectangular as shown in part (a) of FIG. 12, as it is seen in Z direction, the direction of the long edge may be tilted relative to X direction. Even in such a case, all that has to be done is to structure the color sensor 200 so that the length x2 of the area S of detection in terms of X direction is greater than the length y2 of the area S of detection in the direction Y. With such an arrangement, the tolerance for the tilt θx of the color sensor 200 in terms of X direction becomes greater than the tolerance for the tilt θy of the color sensor 200 in terms of Y direction, as shown in FIGS. 12(b-e). Therefore, the second embodiment also can provide the same effect as those provided by the first embodiment.

By the way, from how far away, in terms of angular distance, from Z direction, the detecting portion 207 of the color sensor 200 can accurately catch the reflected light is determined by properties of the optical system which guides the reflected light from the sheet 1, such as the aperture of the condenser lens, size of the diffraction grating 202, and diameter, shape, etc, of the opening of the irises. For example, in a case where a slit is provided between the condenser lens for condensing the light reflected by the sheet 1, and diffraction grating 202, the detection range in terms of the direction parallel to the slit, is wider than the detection range in terms of the direction which is perpendicular to the slit. However, in some cases, the light path is bent in the detecting portion 207 by mirrors or the like. Thus, the direction which corresponds to the direction in which the slit extends means the lengthwise direction of the image of the slit formed on the sheet 1 by reversely following the light pass.

Therefore, it is possible to apply this technology to any measurement unit structured so that the detection range of its detecting portion in the first direction is greater than the length of the detection range in the second direction which is perpendicular to the first direction, regardless of the tilt of the optical axis of its light emitting portion. As long as such a measuring unit as the one described above is positioned so that the difference between the first direction and primary scan direction becomes smaller than the difference between the second direction and primary scan direction, the same effects as those obtained by the first and second embodiment can be obtained.

(Miscellanies)

In the embodiments described above, a measuring device was placed in the image forming apparatus 100. However, this technology is applicable to a stand-alone measuring device, into which a sheet of recording medium, which has an image, the color of which a user wants to measure, is manually inserted by a user. Further, not only is the present invention applicable to a measuring device for measuring the color of an image on a sheet of recording medium, but also, an apparatus for scanning a sheet of recording medium to obtain the optical properties of the sheet surface for other reason than the purpose mentioned above. For example, it is applicable to an apparatus for measuring a sheet of recording medium for the purpose of examining the sheet (for example, apparatus for reading information of an image formed on sheet of recording medium, of material which is permeable by visible light, but impermeable by infrared light.

Further, the present invention is also applicable to an image formation system which comprises: the image forming apparatus 100, and a measuring device which is in connection to the image forming apparatus 100 (case in which measuring device is indirectly connected to image forming apparatus 100 by way of another apparatus is included), and in which a measuring unit such as the color sensor 200 is positioned. In such a case, the measuring device receives a sheet of recording medium, on which an image (pattern) was formed by the image forming apparatus 100, measures the images (patches) on the sheet, and the image forming apparatus 100 is changed in settings as the controlling portion of the image forming apparatus 100 receives the results of measurement from the measuring device.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-002227 filed on Jan. 9, 2019, which is hereby incorporated by reference herein in its entirety.

What is claimed is:

1. A measuring device comprising:
a measurement unit configured to measure an image on a sheet, said measurement unit including a light emitting portion configured to illuminate the sheet with light, and a detecting portion configured to detect light reflected by the sheet;
a supporting unit supporting said measurement unit; and
a driving unit configured to move said measurement unit supported by said supporting unit in a scanning direction;
wherein a size, in the scanning direction, of a detectable range of said detecting portion in which said detecting portion is capable of detecting the reflected light from the sheet is larger than a size, in a sub-scanning direction perpendicular to the scanning direction and a normal direction of a surface of the sheet, of the detectable range of said detecting portion.

2. A measuring device according to claim 1, wherein said light emitting portion has an optical axis of the light toward the sheet is inclined relative to the normal direction, and an angle formed between the optical axis and the scanning direction is smaller than an angle formed between the optical axis and a direction perpendicular to the scanning direction.

3. A measuring device according to claim 1, wherein the size of the detectable range is maximum in the scanning direction among directions perpendicular to the normal line.

4. A measuring device according to claim 1, wherein said detecting portion includes a spectroscope element configured to split the reflected light from the sheet on the basis of wavelength, and a plurality of image sensors configured to detect the light split by said spectroscope element.

5. A measuring device according to claim 1, wherein the scanning direction crosses a direction in which the sheet is fed crosses with the sheet feeding direction, as viewed in the normal direction.

6. A measuring device according to claim 1, wherein said supporting unit includes a guiding member extending in the scanning direction, and said measurement unit includes an engaging portion engaging with said guiding member with a predetermined gap as viewed in the scanning direction.

7. A measuring device according to claim 6, wherein said guiding member includes a first guide member and a second guide member which extend in a direction parallel with the scanning direction and which are spaced in a direction perpendicular to the scanning direction, as viewed in the normal direction,
wherein said engaging portion includes a first engaging part engaged with said first guide member and a second engaging part engaged with said second guide member, and
wherein a gap between said first guide and said second guide in a direction perpendicular to the scanning direction, is wider than a range in which said first engaging part and said first guide member engage with each other in the scanning direction and greater than a range in which said second engaging part and said second guide member engage with each other in the scanning direction.

8. A measuring device according to claim 6, wherein said guiding member is a shaft-like member, and said engaging portion is a cylindrical member having an inner diameter larger than an outer diameter of said shaft-like member.

9. An image forming apparatus comprising:
an image forming device including an image forming unit configured to form an image on a sheet;
a measuring device connected with said image forming apparatus and configured to measure the image formed on the sheet by said image forming device;
wherein said image forming device changes a condition of an image forming operation of said image forming unit on the basis of a measurement result of said measuring device,
wherein said measuring device includes,
a measurement unit configured to measure an image on a sheet, said measurement unit including a light emitting portion configured to illuminate the sheet with light, and a detecting portion configured to detect light reflected by the sheet;
a supporting unit supporting said measurement unit; and
a driving unit configured to move said measurement unit supported by said supporting unit in a scanning direction;
wherein a size, in the scanning direction, of a detectable range of said detecting portion in which said detecting portion is capable of detecting the reflected light from the sheet is larger than a size, in a sub-scanning direction perpendicular to the scanning direction and a normal direction of a surface of the sheet, of the detectable range of said detecting portion.

* * * * *